(12) United States Patent
Li et al.

(10) Patent No.: US 6,631,496 B1
(45) Date of Patent: Oct. 7, 2003

(54) SYSTEM FOR PERSONALIZING, ORGANIZING AND MANAGING WEB INFORMATION

(75) Inventors: Wen-Syan Li, Fremont, CA (US); Quoc Vu, San Jose, CA (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/273,808

(22) Filed: Mar. 22, 1999

(51) Int. Cl.[7] .............................................. G06F 17/21
(52) U.S. Cl. ...................... 715/501.1; 715/513; 707/10; 707/102
(58) Field of Search ............................ 707/513, 10, 526, 707/5, 102, 3; 345/650; 704/7; 709/217–219; 715/513, 526, 501, 1

(56) References Cited

U.S. PATENT DOCUMENTS

| | | | | |
|---|---|---|---|---|
| 5,761,685 A | * | 6/1998 | Hutson ........................ | 707/526 |
| 5,924,105 A | * | 7/1999 | Punch et al. .................... | 704/7 |
| 5,978,807 A | * | 11/1999 | Mano et al. ................. | 345/738 |
| 6,041,360 A | * | 3/2000 | Himmel et al. ................. | 707/1 |
| 6,085,193 A | * | 7/2000 | Malkin et al. ................ | 707/10 |
| 6,112,203 A | * | 8/2000 | Bharat et al. ............... | 707/102 |
| 6,115,718 A | * | 9/2000 | Huberman et al. ......... | 707/102 |
| 6,151,603 A | * | 11/2000 | Wolfe .......................... | 707/10 |
| 6,163,778 A | * | 12/2000 | Fogg et al. .................... | 707/10 |
| 6,167,409 A | * | 12/2000 | DeRose et al. ................ | 707/10 |
| 6,208,995 B1 | * | 3/2001 | Himmel et al. ................ | 706/6 |
| 6,211,871 B1 | * | 4/2001 | Himmel et al. ............. | 345/744 |
| 6,223,178 B1 | * | 4/2001 | Himmel et al. ............... | 707/10 |
| 6,226,655 B1 | * | 5/2001 | Borman et al. ............. | 345/764 |
| 6,253,204 B1 | * | 6/2001 | Glass et al. ................... | 707/10 |
| 6,272,507 B1 | * | 8/2001 | Pirolli et al. ..................... | 707/5 |
| 6,285,999 B1 | * | 9/2001 | Page ............................... | 707/5 |
| 6,314,423 B1 | * | 11/2001 | Himmel et al. ............... | 704/10 |
| 6,334,145 B1 | * | 12/2001 | Adams et al. .............. | 345/650 |
| 6,356,899 B1 | * | 3/2002 | Chakrabarti et al. ........... | 707/3 |
| 6,427,175 B1 | * | 7/2002 | Khan et al. ................. | 709/245 |
| 6,526,424 B2 | * | 2/2003 | Kanno et al. ............... | 715/512 |
| 2003/0055870 A1 | * | 3/2003 | Smethers .................... | 709/203 |

OTHER PUBLICATIONS van Eijck, Jan. Counting the Nodes of a Binary Tree, published Feb. 12, 1998, pp. 1–2, http://www.cwi.nl/~jve/spinoza/LogicModules/induction/node4.html.*

* cited by examiner

Primary Examiner—Joseph H. Feild
(74) Attorney, Agent, or Firm—Sughrue Mion, PLLC

(57) ABSTRACT

The present invention provides a hypermedia database for managing bookmarks, which allows a user to organize hypertext documents for querying, navigating, sharing and viewing. In addition, the hypermedia database also provides access control to the information in the database. The hypermedia database of the present invention parses metadata from bookmarked documents and indexes and classifies the documents. The present invention supports advanced query and navigation of a collection of bookmarks, especially providing various personalized bookmark services. In one embodiment, the present invention utilizes a proxy server to observe a user's access patterns to provide useful personalized services, such as automated URL bookmarking, document refresh, and bookmark expiration. In addition, a user may also specify various preference in bookmark management, e.g., ranking schemes (i.e. by referral, access frequency, or popularity) and navigation tree fan-out. A subscription service which retrieves new or updated documents of user-specified interests is also provided.

44 Claims, 20 Drawing Sheets

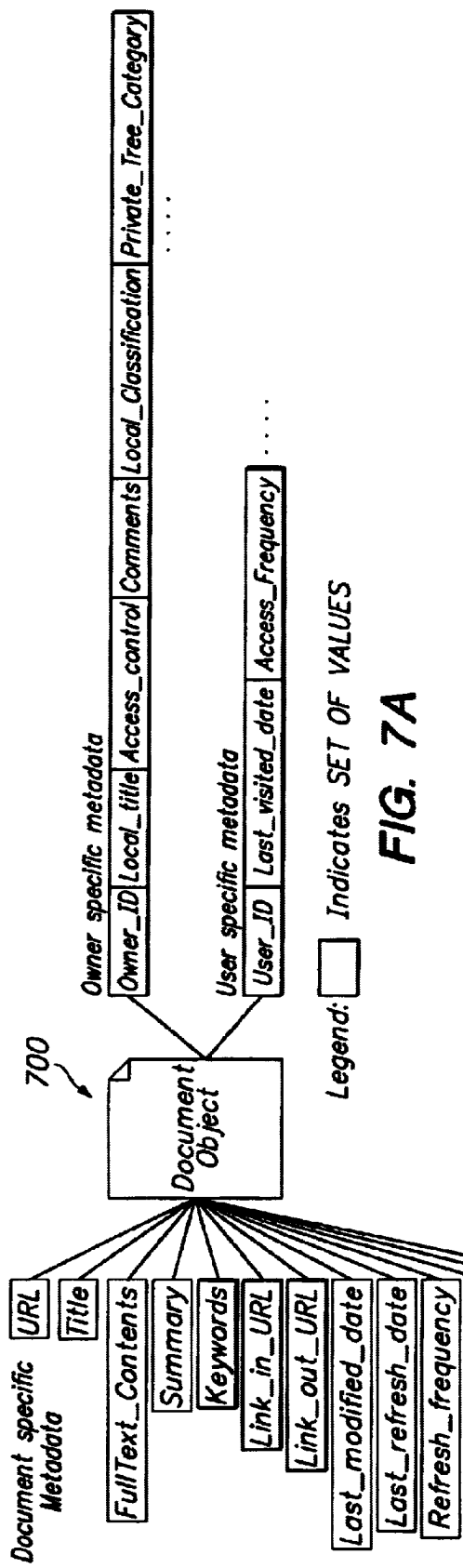

FIG. 7A

| Attribute Name | Data Type | Description |
|---|---|---|
| URL | String | URL of the document |
| Title | List of string | Document title |
| FullText_Contents | Index ID | Index identified used in JTOPIC |
| Summary | List of string | Summary of the document |
| Keyword | Set of string | Keywords associated with the document |
| Link-in URL | Set of pointers and anchors | Documents linking to this document |
| Link-out URL | Set of pointers and anchors | Documents linked by this document |
| Last modified date | Date | Time stamp of document's creation date |
| Last refreshed date | Date | Time stamp of document's last refresh date |
| Refresh frequency | Integer | Time interval between document refresh |
| Dead_Link | Boolean | Indicating if such document is verified as a dead link |
| Category | Set of path strings | Classification results |

FIG. 7B

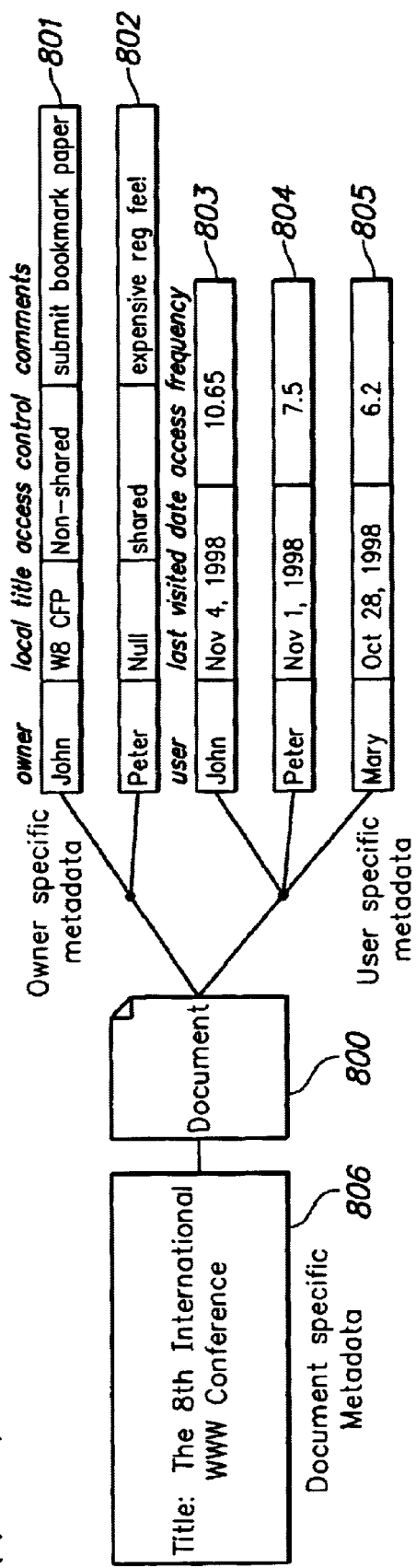

*FIG. 12A*

| | Netscape: Select Subject | |
|---|---|---|
| File Edit View Go Communicator | | Help |

Your keywords were: sports car imnport acura

Click on the desired Newsgroups below (first column) to list newsgroups relevant to that Library of Congress Classification (LCC) Category. Click on the desired LCC ID below (second column) to jump to that part of the LCC.

| Newsgroups | LCC ID | LCC Category Description |
|---|---|---|
| News | GV735 | 735 Umpires, Sports Officiating |
| News | GV743-749 | 743-749 Atheletic and Sporting Goods, Supplies, etc. |
| News | GV1060.5-1098 | 1060.5-1098 Track and Field Atheletics |
| News | GV733-734 | 733-734 Professionalism in Sports, Professional Sports (General) |
| News | GV861-1017 | 861-1017 Ball Games: Baseball, football, golf, etc. |
| News | KF1091-1137 | 1091-1137 Carriers, Carriage of Goods and Passengers |
| News | GV712-725 | 712-725 Athletic Contests, Sports Events |
| News | KF3989 | 3989 Sports, Prizefighting |
| News | GV1040-1060.2 | 1040-1060.2 Cycling, Bicycling, Motorcycling |
| News | GV840.7-857 | 840.7-857 Winter Sports: Ice Hockey, Skiing, Bobsledding, etc. |
| News | SP305-307 | 305-307 Driving |

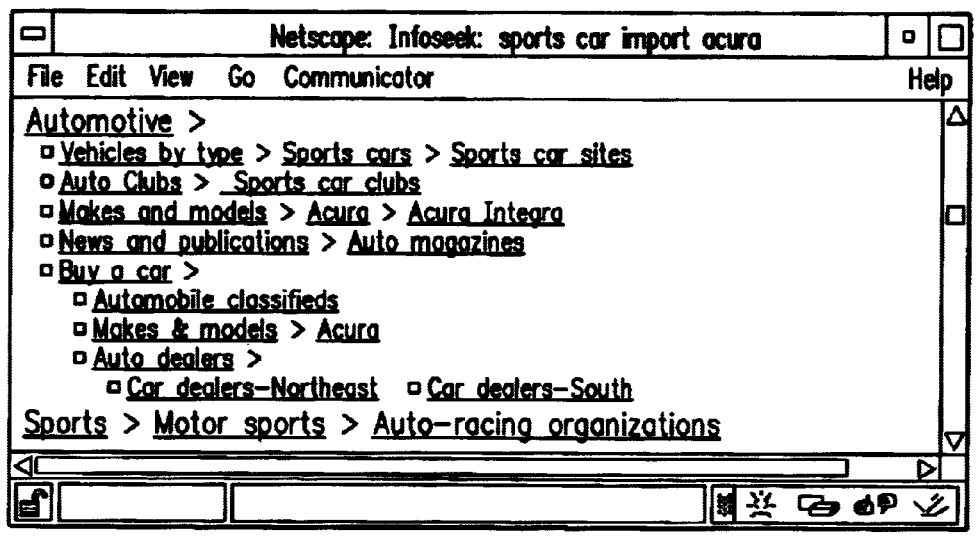

FIG. 13

Computers and Internet/Internet/World Wide Web/Databases and Searching/Web Directories
Computers and Internet/Software/Databases/Web Directories
Computer and Internet/Software/Reviews/Titles/Internet/Web Authorizing Tools/Database Tools
Computers and Internet/Internet/World Wide Web/Databases and Searching
Regional/Countries/Canada/Computers and Internet/Internet/World Wide Web/ Databases and Searching
Regional/Countries/New Zealand/Computers and Internet/Internet/World Wide Web/Database and Searching
Regional/Countries/Australia/Computerand Internet/Internet/World Wide Web/Databases and Searching

| FIG. 14A |
| FIG. 14B |

SYSTEM FOR PERSONALIZING, ORGANIZING AND MANAGING WEB INFORMATION

CROSS REFERENCE TO RELATED APPLICATIONS

The present application is related copending U.S. patent application ("the '759 Patent Application"), entitled "Advanced Web Bookmark Database System," Ser. No. 09/184,759, filed on Nov. 2, 1998, pending and assigned to NEC USA, Inc., which is also the Assignee of the present invention. The disclosure of the '759 Patent Application is hereby incorporated by reference in its entirety.

The present Application is also related to U.S. patent application (the "Navigation Trees Patent Application"), entitled "Personalized Navigation Trees," Ser. No. 09/274,814, U.S. Pat. No. 6,393,427 filed on the same day as the present Application, and assigned to the Assignee of the present invention. The disclosure of the Navigation Trees Patent Application is hereby incorporated by reference in its entirety.

BACKGROUND OF THE INVENTION

1. Field of the Invention

The present invention relates to knowledge retrieval, management and processing on the world wide web and intranets. In particular, the present invention relates to personalizing, organizing and managing information on the world wide web and intranets.

2. Discussion of the Related Art

Users of the world wide web ("web") suffer information overload. The web has no aggregate structure for organizing information into distinct web localities nor does a user have a global view of the entire Web from which to effectively retrieve relevant pages. In fact, a recent survey of 11,7 00 web users indicates that 30.31% of the surveyed users report encountering problems in "finding known information." In the same survey, 27.80% and 12.16% of the surveyed users report, as significant problems, organizing collected information and finding pages already visited, respectively.

Another study focused on bookmark usage indicates that most users gradually build a small sized archive. 68% of the surveyed users have 11 to 100 bookmarks and over 93% of the surveyed users create 0 to 5 bookmarks in each browsing session. The study also found that a larger archive requires a more sophisticated organization, such as automatically classifying bookmarks according to the contents of the documents they mark. An empirical study on users' patterns of revisiting web pages found that 58% of the web pages a typical individual accesses are revisits.

These studies suggest a need for a tool that allows a user to build and organize a large collection of bookmarks than he or she can reasonably manually maintain now.

SUMMARY OF THE INVENTION

The present invention provides a bookmark system having access to a computer network. Such a bookmark system includes (a) an interface to the computer network; (b) a database management system; and (c) a bookmark management system coupled to the database and the interface. In the bookmark system, the bookmark management system creates and maintains in the database document records ("bookmarks") containing information for locating document in the computer network, and retrieves documents, when needed, from the computer network over the interface.

According to one aspect of the invention, the bookmark system includes a document classification system for associating documents of the bookmark system into one or more categories. The classification system may access a classifier program on the computer network through the interface. The bookmark system accesses the computer network through a proxy server. In one embodiment, the database system accesses a lexical dictionary for retrieving a list of keywords that relate to a document. The proxy server can be used to monitor an access pattern for a document and the record identity of the user accessing the document.

According to another aspect of the present invention, the bookmark system classifies a document into one of many categories, each category being a leaf nodes of a hierarchical classification or navigation tree. In one embodiment, each category preferably include less than a predetermined number of documents. When the number of documents in an existing node exceeds the predetermined number of documents, the existing node is split into child nodes. Conversely, the child nodes of a parent node in the navigation tree are merged with the documents in the child nodes sum to less than the predetermined number.

According to another aspect of the present invention, the bookmark management system associates one or more user-specific records to each document record with a user-specific record, and one or more owner-specific records to each document record. The owner-specific records allow the owner of each bookmark to specify whether or not the bookmark is to be shared, thereby implementing access control. More than one owner-specific or user-specific record can be associated with a single document record. The bookmark management system needs only store one bookmark per document. In addition, the bookmark management system can present to a user a customized view of the bookmark.

In accordance with another aspect of the invention, the bookmark system automatically creates a bookmark for a user or for the system when a document is accessed at a high enough frequency over a period of time. In one embodiment, the "connectedness" of a document (i.e., the number of links into the document and referred by the document) provides a measure to assist in selecting bookmarks to include automatically. The "popularity" of a document, i.e., the percentage of users accessing a document, is also used to assist selection and ranking.

Alternatively, the bookmark system allows collection of documents by "crawling". In one embodiment, parameters specified for crawling include the number of levels of links followed from a document. The bookmark system can calculate an estimated time based on the number of links. In addition, the bookmark system retrieves and presents to the user sample documents for user consideration prior to completing the crawling request. The bookmark system allows a crawling request to be limited to the number of levels of links to traverse from a seed document. Also, the crawling request can be limited to within a specified domain.

According to another aspect of the present invention, the bookmark system provides an efficient database management system that includes folders, in addition to document records. In that database system, records are related to each other by pointers, so as to facilitate database operations. The operations of the bookmark management system are achieved by traversal of pointers to document records and folders. For example, when a page has an access pattern satisfying certain predetermined criteria, the bookmark management system can include a bookmark to the page in a special purpose folder by simply associating the folder with a pointer. Such folders can include, deletion folders, hot link folders, etc. Subscription folders can also be set up, which periodically or by incremental search provides new or updated information for selected bookmarks. The subscribing users are notified when new or updated information is available.

The present invention is better understood upon consideration of the detailed description below and the accompanying drawings.

BRIEF DESCRIPTION OF THE DRAWINGS

FIG. 7a shows the metadata associated with document 700 in one embodiment of the present invention.

FIG. 7b is a table showing the document-specific metadata of document 700.

FIG. 8a shows, based on the document model of the present invention, PowerBookmarks providing a different view of bookmark 800 to different users John, Mary and Peter.

FIG. 8b shows owner John's view of bookmark 800 of FIG. 8a.

FIG. 8c shows owner Peter's and user Mary's view of bookmark 800 of FIG. 8a.

FIG. 12a shows a classification for a document containing keywords "sports", "car", "import", and "acura" under the LCC scheme.

FIG. 12b shows a classification for the document of FIG. 12 under an internet search engine Infoseek.

FIG. 13 illustrates the classification categories received from a classifier using the keywords "Web" and "Database".

DETAILED DESCRIPTION OF THE PREFERRED EMBODIMENTS

One embodiment of the present invention is provided in a system that includes a web database ("WebDB") which is described in the '759 Patent Application. The present invention is based on the concept of "augmented hypermedia"—i.e., a system which extracts useful meta-data (from accessed URLs) and observes user behavior to provide valuable personalized services. Unlike prior art bookmarking schemes, the present invention allows sharing of information, provides access control and supports querying and automated bookmark classification based on the contents of the underlying documents. In addition, many useful personalized services, such as automated bookmarking, bookmark expiration, and document subscription, can be provided.

Figure 1:
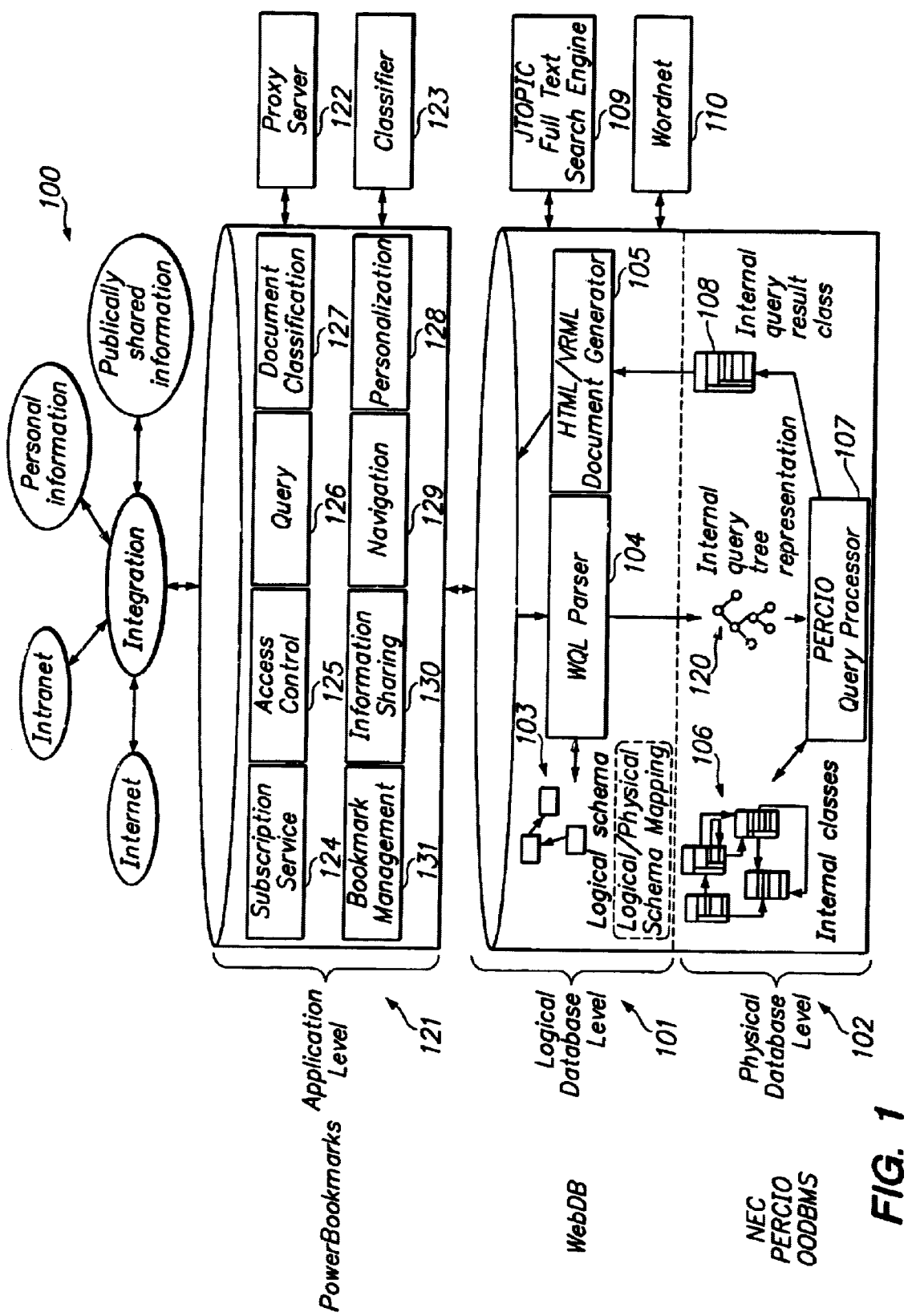
FIG. 1 shows one embodiment of the present invention in hypermedia database system 100.

FIG. 1 shows one embodiment of the present invention in database system 100. As shown in FIG. 1, database system 100 includes a logical database "WebDB" 101, which is built on top of a physical object-oriented database management system ("OODBMS") 102, which can be implemented by the NEC PERCIO OODBMS. Unlike most search engines, which focus on information retrieval based on keywords, WebDB 101 supports database-like comprehensive query processing and allows a user to navigate document structures, contents, and linkage information. Hypermedia database 100 utilizes the query, modeling, and navigation capabilities provided by WebDB 101 to provide information sharing, access control, and customization services.

WebDB 101, which is described in the Copending Application incorporated by reference above, includes modules 103 for logical Web document modeling and storage, query language processor 104, and HTML/VRML document generator 105. Physical OODBMS 102 includes modules 106 for internal class representations, an object depository, query processor 107, and a query result class generator 108. Two external components: full text search engine 109 and an on-line lexical dictionary 110 are provided to perform full text search and as an on-line dictionary reference for such tasks as indexing and query expansion. Full text search engine 109 and on-line lexical dictionary 110 can be implemented by JTOPIC from NEC and Wordnet, known to those skilled in the art.

WebDB 101 can be queried using a query language WQL (Web Query Language) for document query and manipulation, which is interpreted by query processor 104. WQL is modeled after query language SQL3, known to those skilled in the art. WQL extends the traditional tables of relational databases and classes of object-oriented databases by additional data management functions which are optimized for document formats and navigation. A statement in WQL contain two parts: a "SELECT . . . FROM . . . WHERE" clause for specifying retrieval of data contents from hypermedia database 100 and a "CREATE . . . AS . . . " clause for specifying the output HTML format and navigation of the query results. In WebDB 101, HTML documents are logically modeled as object-oriented hierarchical structures, while physically modeled and stored in the underlying NEC PERCIO OODBMS as classes. Modules 103 of WebDB 101 are mapped to the classes of modules 106 according to a logical/physical schema maintained for query translation. A visual query interface (not shown) is supported to assist users in specifying queries. Actual WQL queries are then generated automatically by a WQL query generator. Hence, the complexities of the underlying schema and the query language remain transparent to the user.

Queries in WQL are translated into their corresponding internal query tree representations 120 for processing against the object-oriented class schema. WQL parser 104 translates the WQL queries according to the logical or physical schema. After query processor 107 completes query processing, the results are returned by the physical OODBMS 102 in internal object-oriented class format. HTML/VRML document generator 108 then converts the query results from their internal representations to their corresponding HTML/VRML forms.

In database system 100, bookmark management system 121 ("PowerBookmarks") provides application level services and personalized services. PowerBookmarks accesses both the Internet and an intranet and allows information sharing amongst multiple users. Some of the PowerBookmarks services include subscription (124), access control (125), query processing (126), document classification (127), personalization (128), navigation (129), information sharing (130), and bookmark management (131). Each of these services are discussed in further detail below. Power-Bookmarks thus serves as an integrated environment for Web information management and access. PowerBookmarks interacts with two external components: proxy server 122 and classifier 123. Proxy server 122 collects a user's navigation and browsing history to allow PowerBookmarks to automatically adjust for different usage patterns, as well as to provide for an automated bookmarking service explained in further detail below. Classifier 123 classifies document classification.

PowerBookmarks allows bookmarks to be shared and accessed by different users. Three types of records are maintained for a bookmarked URL: "document-specific metadata", "owner-specific metadata" and "user-specific information". FIG. 7 shows the metadata associated with a document in one embodiment of the present invention. As shown in FIG. 7a, document 700 is associated with a set of document-specific metadata which consists of fields "URL", "title", "FullText_contents", "Summary", "Keywords", "Link_in URL", "Link_out URL", "last modified date", "Last refreshed date", "Dead_link" and "Category". The definitions of these fields are provided in Table 1 of FIG. 7b. Specifically, in this embodiment, field "FullText_Contents is the index identifier returned by JTOPIC full text search engine 109 when a document is indexed in JTOPIC. When a user issues a query for a full text search, JTOPIC returns a set of index identifiers for the documents matching the query criteria. The fields "FullText_Contents" and "URL" form the mapping between the metadata stored in WebDB and JTOPIC.

The "last modified date" field provides the time stamp of document's last modification, which can be used as a measure for the "freshness" of a document. The "refresh frequency" field allows a user to set the frequency (e.g., in days) at which the information about a specific document bookmark is refreshed in the database. A refresh is performed by invoking an incremental loader at specified time intervals. A user can set the refresh frequency to "auto" to allow PowerBookmarks to automatically adjust the refresh frequency based on the values of "last modified date", "access frequency", and "last refreshed date". During refresh, if the system finds that a given URL has been moved, the Dead_link field is set to "true" and PowerBookmarks allows a user to specify a criterion for automated removal of dead links and inactive bookmarks. Inactive bookmarks can be identified based on the values of Last_visited_date".

Although different people can bookmark and access the same URL, PowerBookmarks stores only one copy of document and its document specific metadata. More than one owner-specific metadata records, and more than one user-specific metadata records can be associated with each URL, so that personalized service can be provided. An "owner-specific metadata" record identifies the user in the "owner_ID" field. The owner of the "owner-specific metadata" record can provide his own "local_title" for, and can set access control restrictions (e.g., "shared" or "private") on, the document associated with the URL. Further, the fields "Local_classification" and "Private_Tree Category" the document to be classified under the owner's classification scheme (discussed in further detail below). (Note that, a similar field "category" is provided in the "document-specific metadata" record). The "comments" field allows the owner to associate personal comments of a bookmarked document.

In this embodiment, user-specific metadata records are maintained for the automated bookmarking services discussed in further below. Typically, associated with each user-specific metadata record is (a) the "user_ID" field, specifying the identity of the user; (b) the "access_frequency" field, storing the frequency at which the user access the document of the URL; and (c) the "last_visited date" field, indicating when the last time was that the user accessed the document of the URL.

As noted above, "category" fields are provided in both document-specific metadata records and "owner-specific metadata" record. If a document is specified shared, it may be accessed in both the public bookmark database and private bookmark databases. (As used in this context, these databases can be implemented by "virtual databases"—i.e., views). However, the document may be classified into different categories in the public and private databases. In general, the public bookmark database has a larger number of URLs, so that the classification in the public bookmark database is typically of a finer classification granularity.

Based on this modeling, PowerBookmarks can provide a different view of the same document to different users, as illustrated in FIG. 8. As shown in FIG. 8a, bookmark 800 is associated with a document-specific metadata record 806, two owner-specific metadata records 801 and 802, corresponding to users John and Peter and three user-specific records 803–805, corresponding to users John, Peter and Mary. FIG. 8b shows owner John's view of bookmark 800 of FIG. 8a. Since owner Peter has designated bookmark 800 as shared, owner John sees both his own view (i.e., owner-specific metadata record 801) and owner's Peter view (i.e., owner-specific metadata record 802) of the bookmark. Thus, owner John has access to the comments of owner Peter. Since owner John has provided a local title (i.e., specified a title in the "local title" field of owner-specific metadata record 801), PowerBookmarks substitutes owner John's local title for the title specified in document-specific metadata record 806.

FIG. 8c shows owner Peter's and user Mary's views of bookmark 800. Since owner John has designated his bookmark on document 800 to be private, owner Peter sees only his own owner-specific metadata record and the document-specific metadata record to be associated with bookmark 800. Since owner Peter has specified his own bookmark to be "shared", user Mary has access to owner John's owner-specific metadata record 802 but not owner John's owner-specific metadata record 801. In addition, user Mary is not allowed to add comments to bookmark 800.

Figure 9:
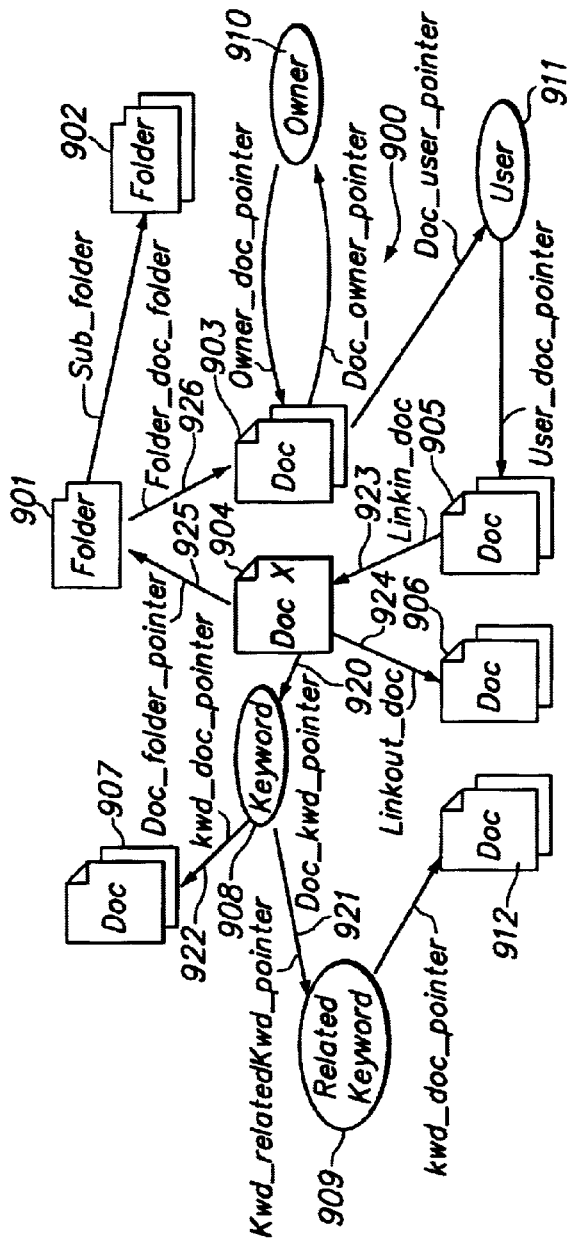
FIG. 9 illustrates an index structure 900, which is designed for efficient processing for navigation requests.

One advantage implementing physical OODBMS 102 in NEC's PERCIO OODBMS is its flexible modeling capability. Specifically, PowerBookmarks takes advantage of pointer-based operations, such as pointer traversal or intersection of two sets of pointers, rather than the more expensive join operations in other relational database management systems. FIG. 9 illustrates an index structure 900 of PowerBookmarks, which is designed for efficient processing for navigation requests, using the pointer operations of physical OODBMS 102.

As shown in FIG. 9, index structure 900 has five types of navigational nodes: "folders" (e.g., folders 901–902), "documents" (e.g., documents 903–907), "keywords" (e.g., keyword 908), "user" (e.g., user 911) and "owner" (e.g., owner 910). Navigational nodes are interconnected by pointers. For example, if a user accesses document 904 (labeled "Doc X" in FIG. 9), the user can access, through PowerBookmarks, all the document-specific metadata records. Some possible navigations that the user may perform are:

1. find documents which have common keywords as in document 904. In this instance, PowerBookmarks follows the "Doc_kwd_pointer" pointer 920 associated with doc 904 to navigational node ("keyword") 908 and "Kwd_doc_pointer" pointer 922 to reach document 907.
2. find documents with keywords related to keywords in doc 904. In this instance, PowerBookmarks follows "Doc_kwd_pointer" pointer 920 of document 904 to navigational node 908, and then follows "Kwd_relatedKwd_pointer" 921 to navigational node ("Related keyword") 909 and then through Kwd_doc_pointer to reach document 912.
3. find all documents which link to or are linked by document 904. In this instance, PowerBookmarks calculates the union of "Linkout_doc" and "Linkin_doc" pointers 923 and 924 of document 904.
4. find all documents in the same category (i.e. folder) as document 904. In this instance, PowerBookmarks follows "Doc_folder_pointer" pointer 924 to reach folder 901, and then follows "Folder_doc_pointer" pointer 926 to reach document 903.

PowerBookmarks supports three ways for collecting bookmarks (i.e., universal resource locators (URLs) which point to web documents). First, bookmarks are collected through an interactive search or navigation on the Internet. Second, bookmarks can be collected by a batch search or navigation process called "crawling". Third, bookmarks can be collected automatically by PowerBookmarks.

Figure 2:
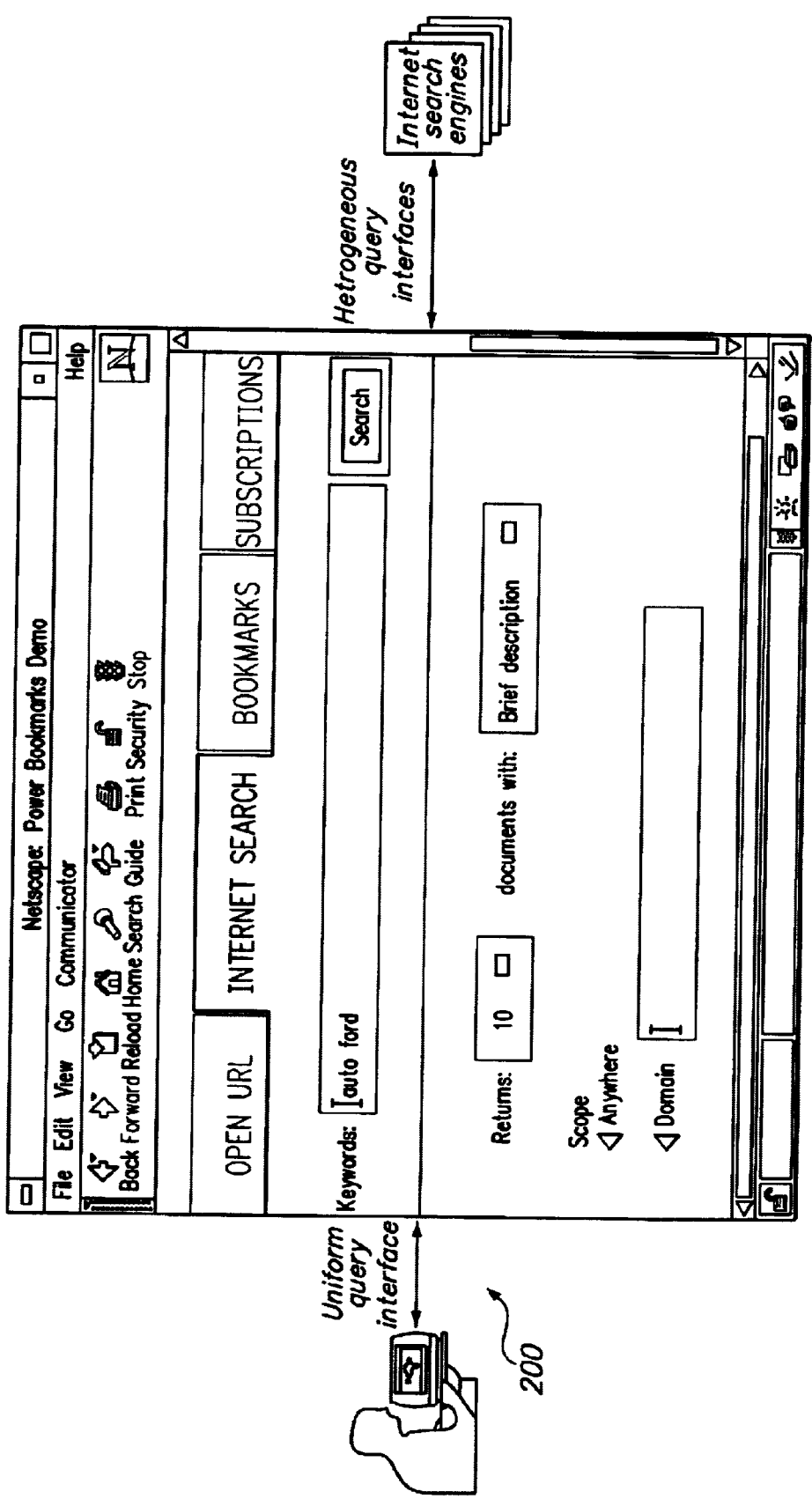
FIG. 2 shows query interface 200 of PowerBookmarks, which simplifies interfacing to diverse query interfaces, layout, terminology, and services offered by different search engines.

Typically, a user collects the URL of a document of particular interest interactively. To enable interactive search, a search engine usually provides a set of services for query of web information. Some of these services are offered only in certain search engines. Powerbookmarks offers uniform query interface 200 (shown in FIG. 2) which simplifies interfacing to diverse query interfaces, layout, terminology, and services offered by different search engines. Consequently, a PowerBookmarks user need not be concerned with the heterogeneity of search engines. Query interface 200 can be customized based on the user's preferences. Query interface 200 forwards a user's queries to a corresponding search engine. For example, queries related to link-in or temporal relations can only be obtained only from certain search engines. Queries on classification categories are forwarded to a classifier, such as some search engines on the Internet, which maintains a classification scheme and a larger collection of documents already categorized.

Figure 3:
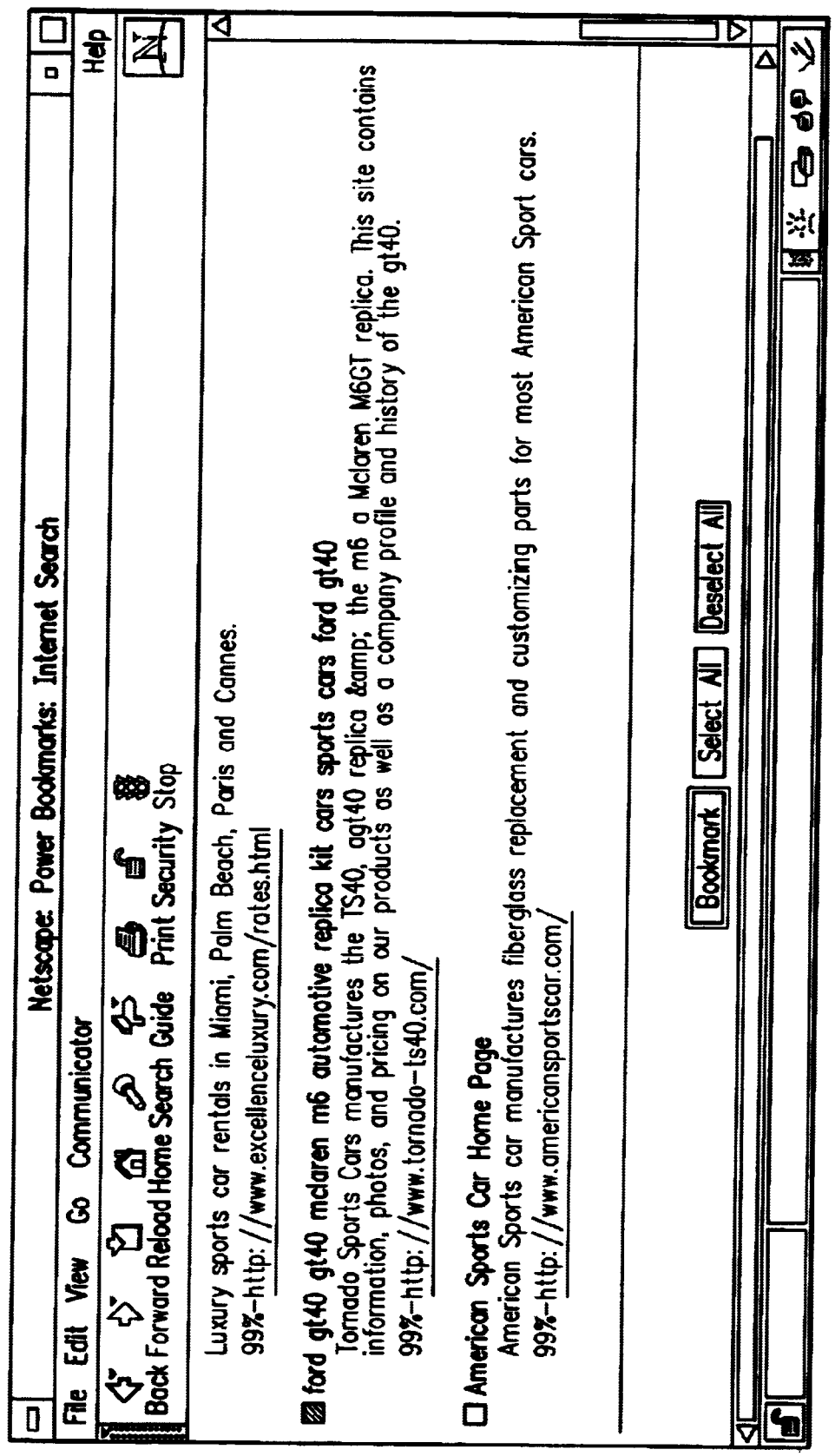
FIG. 3 shows an example of query results returned to query interface 200.

Upon receiving results to a query from a search engine, Powerbookmarks extracts metadata from the query results returned. FIG. 3 show an example of query results returned to query interface 200 which because of its simplicity, is easier to read compared with the results typically returned by the Internet search engines. Query interface 200 allows a user to customize the result presentation format based on the user's preference.

With query interface 200, a user can select multiple URLs for browsing in a "slide show" fashion". The user can also press a button to collect an URLs of interest into PowerBookmarks. When a user request is issued, the system performs a sequence of tasks as follows: (1) downloading the documents pointed to by the collected URLs; (2) parsing metadata, such as links, keywords, and summary from the collected URLs; (3) indexing the collected URLs into formats usable by JTOPIC and WebDB 100; and (4) classifying the collected URLs into categories.

Figure 4:
FIG. 4 shows in query interface 200 options to allow organization of query results.

PowerBookmarks provides various services to assist users organize query results. FIG. 4 shows in query interface 200 options to allow organization of query results.

Figure 5:
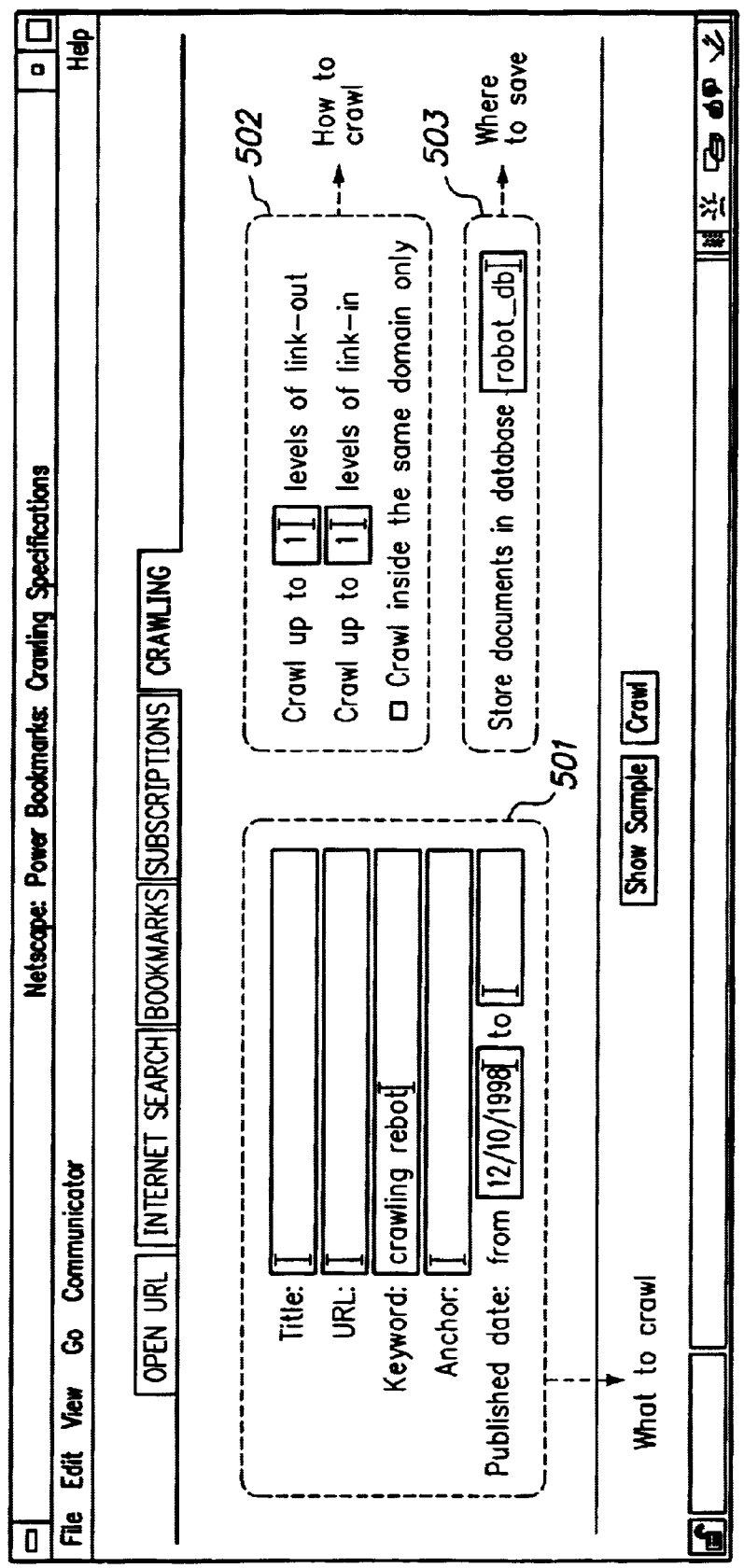
FIG. 5 shows a specification window in PowerBookmarks for specifying a crawling request.

Crawling can be seen as a "batch" mode of collecting Web documents, which allows a user to collect a number of documents. In PowerBookmarks, crawling is accomplished by using Internet search engines. FIG. 5 shows a specification window in query interface 200 for specifying a crawling request.

Crawling is achieved in PowerBookmarks by a number of steps. First, PowerBookmarks obtains one or more seed URLS. As shown at screen portion 501 of FIG. 5, a user can specify a set of criteria which identify the seed URLs. The criteria include title, URL, keywords, anchors, and publication date (i.e. last modified date). Based on these specified criteria, PowerBookmarks generates queries and forwards them to one or more web search engines. URLs meeting the specified criteria are then returned by the web search engines. These URLs are seed URLs for the crawling.

Second, PowerBookmarks traverses the links of the seed URLs. Screen portion 502 of FIG. 5 allows a user to specify one or more traversal strategies. Specifically, in PowerBookmarks, the crawling strategies include traversing a specified number of levels of links pointing to the documents of the seed URLS, and traversing a specified number of levels of links pointed to by the documents of the seed URLS. The crawling can also be restricted traversal of no more than a specified number of URLs. To traverse links pointed to by documents of the seed URLs, the documents of the seed URLs are downloaded and parsed. Internet search engines are queried for the documents which points to the seed URLs. If the number of levels for link traversal is greater than 1, the URLs of documents downloaded in each level of links are used as seed URLs for the next level of links to be traversed. This procedure is applied until the specified number of levels of links is traversed. The user can also confine the crawling to within the same domain as the seed URLs, or a specified domain.

At screen portion 503, a user can specify a system for storing and indexing the crawling results in the database.

Figure 6:
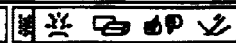
FIG. 6 shows sample results 600 of the crawling request of FIG. 5.

Since crawling is a time-consuming task, PowerBookmarks provides useful feedback information to allow a user decide if the crawling task should be carried out as specified. The feedback information includes sample URLs, estimated number of URLs to be crawled, and an estimated time remaining for completing the crawl. To provide sample URLs, PowerBookmarks provides a subset of the crawling results to the user. As shown in FIG. 6, PowerBookmarks provides 10 sample crawling results, based on the specification in screen portion 501 of FIG. 5. The user can then examine the contents of samples to judge if the crawling results are of his or her interests.

Estimated number of URLs to be crawled and time required are provided to let the user determine whether or not the number of URLs remaining to be crawled is within his or her expectation, and if time required to complete the crawl is acceptable. Based on the estimation, the user can then refine or relax the crawling specifications. To estimate the number of URLs to crawl, the following parameters are defined:

1. The list of seed URLs, denoted by S(Q).
2. The number of seed URLs in S(Q), denoted by Count (S(Q)).
3. The list of seed URLs, not including S(Q), derived by traversing n levels of link from S(Q), denoted by $S_{outward}(Q, n, d)$, where d is either 0 or 1 representing, respectively, where the crawling procedure is to be carried out in all domains or in the same domain.
4. The list of seed URLs derived by traversing n levels of link pointing into S(Q), denoted by $S_{inward}(Q, n, d)$, where d is either 0 or 1 representing, respectively, where the crawling procedure is to be carried out in all domains or in the same domain.
5. The average number of outward links from S(Q) at depth n, not including backward links, denoted by OutDegree(S(Q), n, d), where d is either 0 or 1 representing, respectively, where the crawling procedure is to be carried out in all domains or in the same domain. Note that OutDegree(S(Q), n, d) is the same as OutDegree $(S_{outward}(Q\ n-1, d), 1, d)$.
5. The average number of inward links pointing into S(Q) from URLs n levels away, not including backward links, denoted by OutDegree(S(Q), n, d), where d is either 0 or 1 representing, respectively, where the crawling procedure is to be carried out in all domains or in the same domain. Note that InDegree(S(Q), n, d) is the same as InDegree $(S_{inward}(Q, n-1, d), 1, d)$.
6. Number of levels to crawl following outward links, denoted by $L_{outward}$.
7. Number of levels to crawl following inward links, denoted by $L_{inward}$.

Thus, Count($S_{outward}(Q, n, d)$) can be estimated by Count $(S_{outward}(Q, n-1, d))$*OutDegree($S_{outward}(Q\ n-1, d)$, 1, d). Similarly, Count $(S_{inward}(Q, n, d))$ can be estimated by Count($S_{inward}(Q, n-1, d)$)*InDegree($S_{outward}(Q\ n-1, d)$ 1, d). Further, for a given crawling specification, i.e., a given list of seed URLs S(Q), levels of outward links $L_{outward}$, levels of inward links $L_{inward}$ and domain d, the estimated number of URLs to be crawled, denoted by Count (Q, $L_{outward}$, $L_{inward}$, d) is given by:

Count (Q, $L_{outward}$, $L_{inward}$, d)=Count (S(Q))+Count ($S_{inward}(Q, L_{inward}, d)$)+Count ($S_{outward}(Q, L_{outward}, d)$)

The estimated time to complete a crawling task can then calculated by multiplying Count (Q, $L_{outward}$, $L_{inward}$, d) by the average time for processing a document. Since the average time to download a document is much greater than the average time to extract links and to ascertain a backward link, the average time for processing a document is close to the average time required for downloading a document. As the size of the crawling space increases very quickly as the number of level of links to traverse increases, limiting the crawling within the same domain can sometimes be preferable. Note that the percentage of links in the seed URLs pointing to other domains is much higher than the percentage of links in the second level URLs pointing to other domains. Further, in one experiment, about 12.5 percent of documents could not be downloaded within reasonable time due to server errors, network errors, or the documents have moved. Empirical data of this kind can be used to increase the accuracy of the time estimate. The URLs and meta-data resulting from the crawling request is stored in the specified database (specified by field 503 of FIG. 5)

In addition to collecting bookmarks interactively and by crawling, PowerBookmarks provide an automated bookmarking service. To accomplish automated bookmarking, proxy server 122 (FIG. 1) tracks user Internet access behaviors. In addition to its role as a proxy server for web access, proxy server 122 includes an intelligent history management tool, keeping the following information for each URL:

1. number and dates of visits to the URL;
2. the URLs referring (i.e. navigating) to this URL;
3. URLs referred from this URL; and
4. dates on which such navigation occur.

Since the pages a user views frequently is likely to be revisited frequently in the future, PowerBookmarks automatically bookmarks URLs with an access frequency higher than a specified value over a specified time period. In addition, PowerBookmarks provides a more sophisticated automated bookmarking service taking into consideration a user's navigation behavior and the associations between the URLs being accessed and existing bookmarks, since visits to related documents are often correlated. To identify URLs for bookmarking, PowerBookmarks calculates for each URL a "page rank" using the access frequency and the link structures of the document associating with the URL. To exploit link structures, a "connectedness" measure is used to quantify the importance of related pages. Connectedness is defined as the number of pages a user can reach from or to a page within a predefined distance expressed in the number of links. The page rank is the product of the access frequency and the connectedness.

To provide automated bookmarking, PowerBookmarks performs the following steps:

1. partitioning the collected access history on the proxy server into site clusters, according to host names.
2. calculating the page rank for each URL. (In one embodiment, only links within a distance of 2 from the URL is considered).
3. bookmarking the URL when its page rank exceeds a specified threshold value.

Taking advantage of both access frequency and the link structure, this method is more likely to bookmark those pages having a high probability of being revisited. This method is superior to a method which considers only access frequency of each URL or which evaluate URL independently for pages which have few associations with the accessed URLs. When URLs are independently evaluated, an index page and the content pages referred to by the index page are equally likely to be bookmarked.

Figure 10:
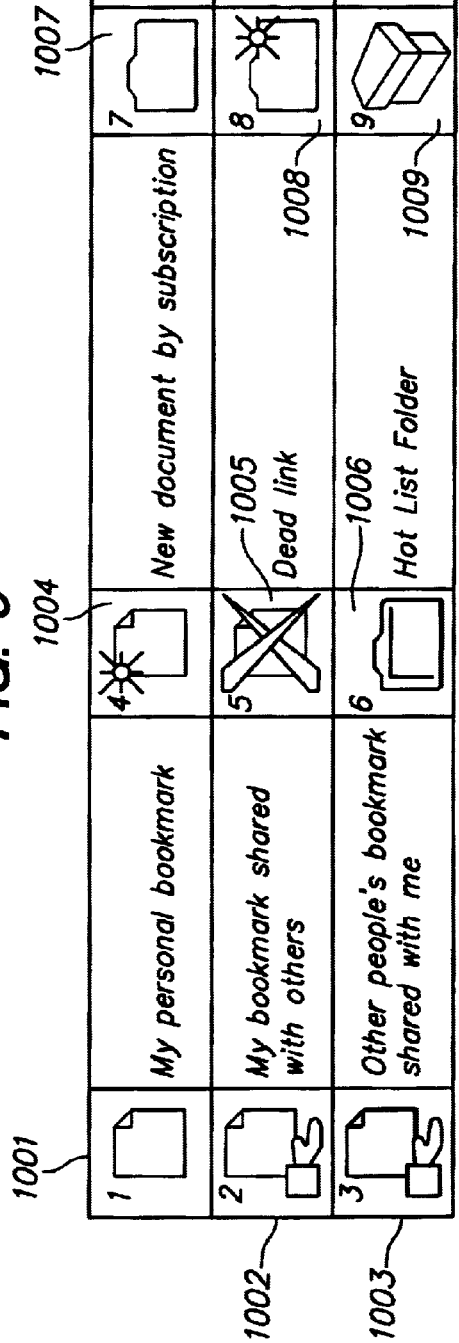
FIG. 10 shows iconized representations of various documents used in a user interface of PowerBookmarks.

PowerBookmarks allows users to share bookmarks. Shared bookmarks in PowerBookmarks can be viewed as a public and virtual collection of bookmarks for all users. There are five different types of documents in PowerBookmarks, classified according to ownership, access control specification, and other attributes. FIG. 10 shows iconized representations of various documents used in a user interface of PowerBookmarks.

In FIG. 10, icons 1001, 1002, and 1003 represent, respectively, an owner's private bookmarks, an owner's shared bookmarks, and other people's shared bookmarks. Icons 1004 represents subscribed documents. PowerBookmarks allows a user to specify certain query criteria for subscribing new or updated documents in the Internet or intranet. Subscribed documents have no owner-specific or user-specific metadata records, and are classified into subscription folders until they are deleted or bookmarked into PowerBookmarks.

Icon 1005 represents deadlink documents. In the course of performing automated document refresh, PowerBookmarks occasionally finds documents moved. In this embodiment, PowerBookmarks marks the moved documents as "deadlinks" and so indicate each such document by icon 1005.

In PowerBookmarks, a folder is defined as a container for a set of documents, a set of sub-folders, or a combination of documents and sub-folders. Four types of folders are defined in PowerBookmarks:

1. "Hot List Folder"—a collection of the most frequently accessed bookmarks for each user. The URLs in a hot list folder are automatically maintained by PowerBookmarks to allow the user fast access (i.e., "shortcut") to his or her most frequently used bookmarked URLs. A hot list folder is represented by icon 1006.

2. "Deleted Bookmark Folder"—a folder for deleted bookmarks. A user can set a preference for automated removal of "dead links" or "inactive" bookmarks, whose access frequency is lower than a preset threshold value. A Deleted Bookmark Folder is represented by icon 1009.

3. "Subscription Folder"—a subscription folder is functionally the same as a regular folder, except that when a new document is introduced into a subscription folder since the user's last visit, icon 1008 (rather than icon 1007) is used.

4. "Bookmark Folder"—a bookmark folder includes bookmarks to PowerBookmark's automated bookmarking services. As discussed above, automated document bookmarking services can be provided according to content-based classifications, which are discussed in more detail below.

Figure 11:
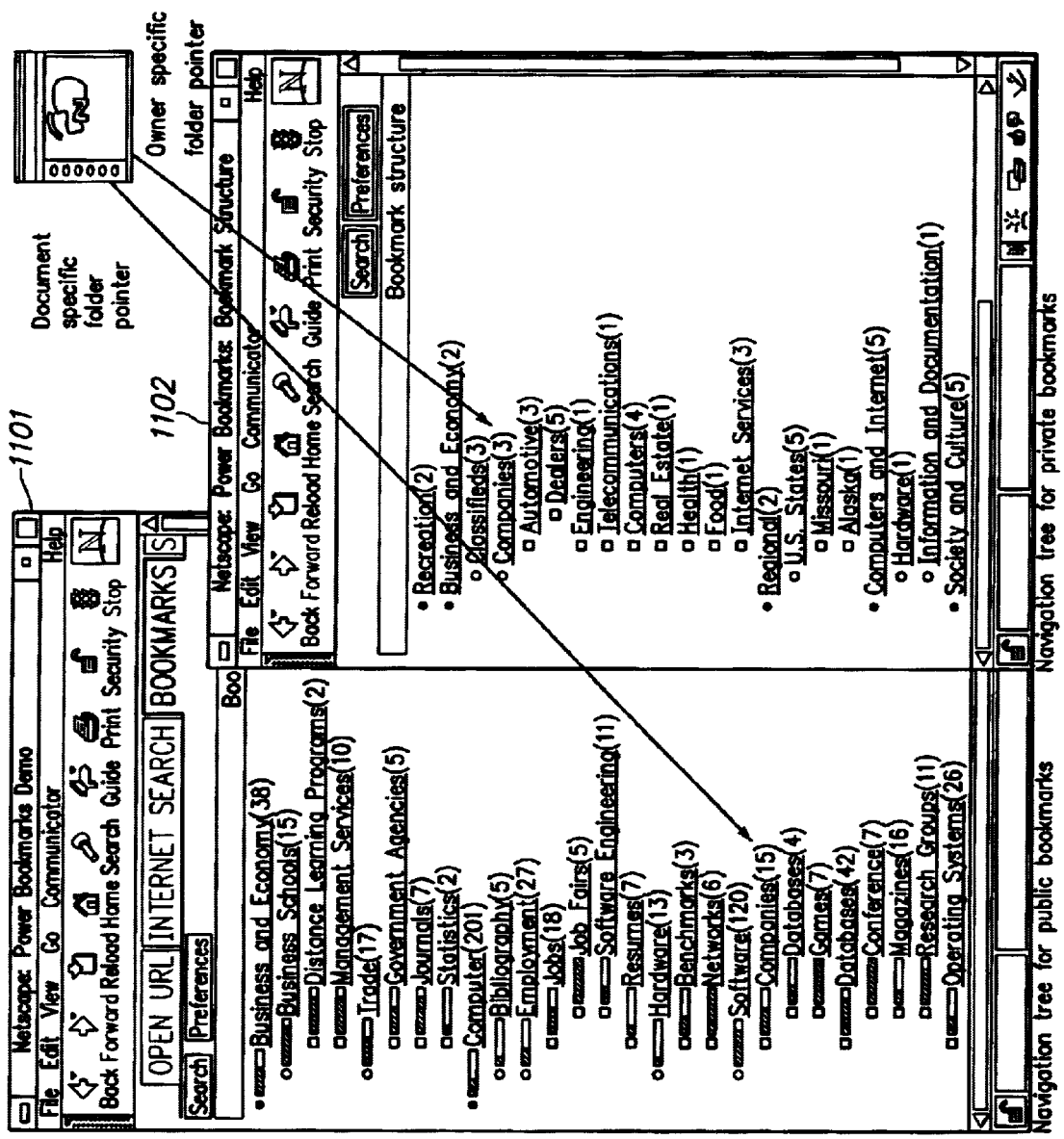
FIG. 11 shows, in display windows 1101 and 1102, two navigation trees 1110 and 1120, corresponding respectively to navigation trees for a public bookmark database and a private bookmark database.

In PowerBookmarks, documents are classified under a hierarchical classification structure ("classification tree" or "navigation tree"), such as shown in FIG. 9. FIG. 11 shows, in display windows 1101 and 1102, two navigation trees 1110 and 1120, corresponding to navigation trees for a public bookmark database and a private bookmark database. FIG. 11 displays for each node both the number of bookmarks in the folder and the access frequency of each folder. In addition, a temperature icon is shown alongside each node in navigation tree 1110, to graphically indicate the access frequency of each node. As shown in FIG. 11, the URLs of most interests are "computers job fairs", "computer game companies" and "database conferences".

In each navigation tree, each node is represented as a bookmark folder. PowerBookmarks provides automated document classification using external classifier (e.g., the Pharos system, which is based on the Library of Congress Classification (LCC)). FIGS. 12a and 12b show, respectively, a classification for a document containing keywords "sports", "car", "import", and "acura" under LCC and classification for the same document under an internet search engine. In FIG. 12a, each LCC ID represents a node in the LCC hierarchical structure. The label of a node is a tag along the path from the top-level root node to the node into which the document is classified. However, categories provided by many classifiers are too fine, e.g., 6 to 7 levels. While classifying to such fine categories provide an accurate classification of the subject matter, such classification hierarchy is not convenient for a user to navigate because, to reach a document, many steps have to be taken to traverse the classification tree. In fact, many usability studies have pointed out that a deep hierarchy results in inefficient information retrieval because of the numerous traversal steps required and the tendencies of users to make mistakes along the way.

Using the observations that (a) a typical user's bookmark collection contains less than a thousand URLS, and (b) a large collection of a shared bookmarks may have up to a few thousands of URLs, PowerBookmarks provides navigation trees which are adjusted according to the numbers of documents in collections, and user preferences (e.g. breadth of the navigation tree), and user behavior (e.g. document access frequency). Accordingly, PowerBookmarks provides navigation trees typically of a depth of 3 or 4 levels, so as to ensure high usability. PowerBookmarks constructs a navigation tree dynamically for efficient navigation, so that the number of traversal steps is minimized, but without compromising accuracy of classification.

The Navigation Trees Patent Application (incorporated by reference above) provides a procedure that constructs and dynamically maintains a navigation tree according to preset breadth. The procedure creates and deletes sub-nodes to an existing node when required (i.e., when certain preset conditions are satisfied), when new documents are created and inserted.

FIG. 13 illustrates the classification categories received from a classifier using the keywords "Web" and "Database". Under the procedure described in the Navigation Trees Patent Application, PowerBookmarks may place the document into categories "Computers and Internet: Internet", "Computers and Internet: Software" and "Regional: Countries" categories respectively instead of the seven categories returned by the classifier, if each of these categories include a number of bookmarks less than a predetermined value.

In addition, to take into consider the users' access patterns, when splitting a node, PowerBookmarks keeps frequently accessed documents in the node, while pushing less frequently accessed documents to the lower new level.

Deleting a document is a reverse operation of insertion described above.

Figures 14, 14A:
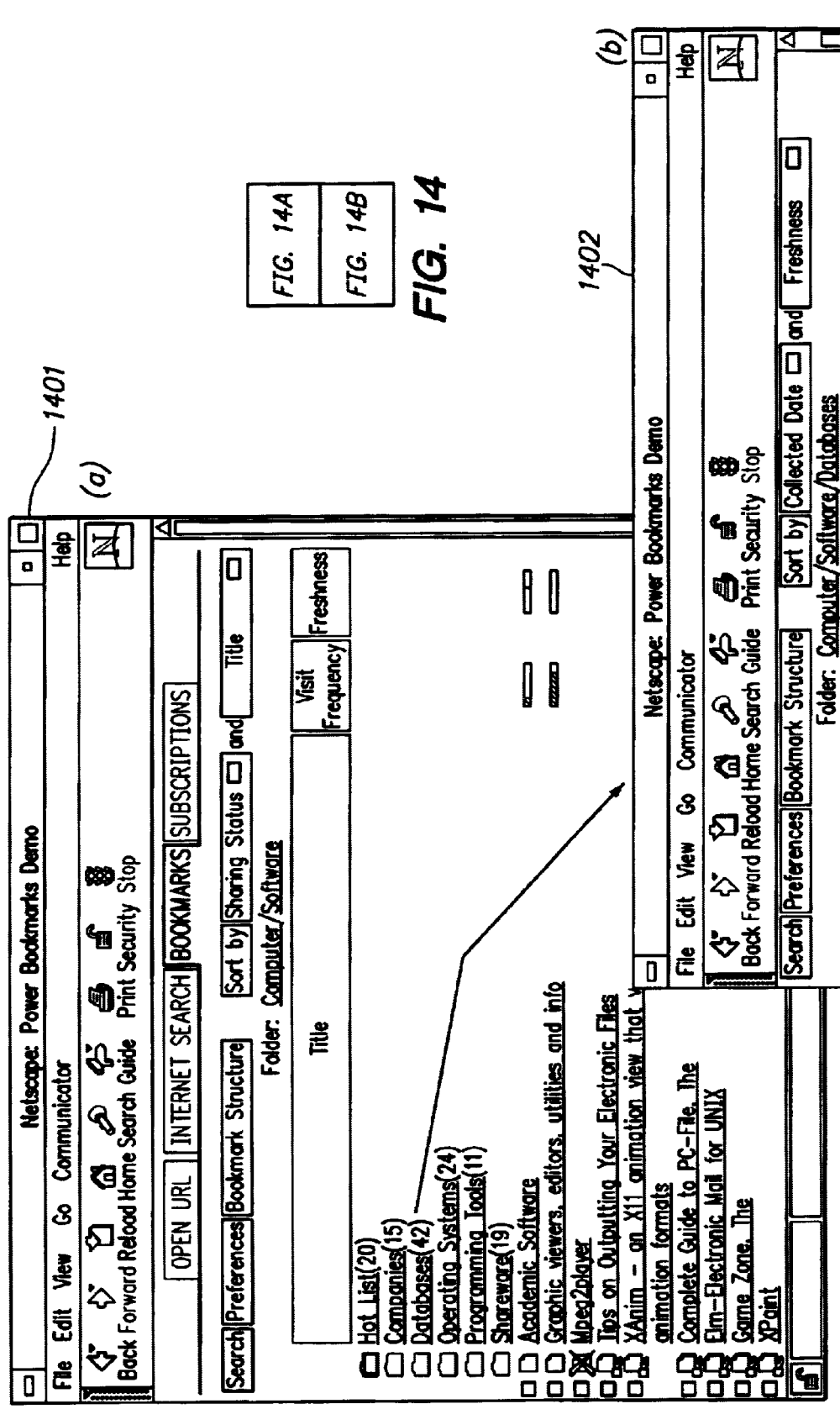
FIG. 14 shows page 1401 listing the documents and folders in the "Computer/Software" category and page 1402 listing the documents and folders in the "Computer/Software/Database".
Figure 14B:
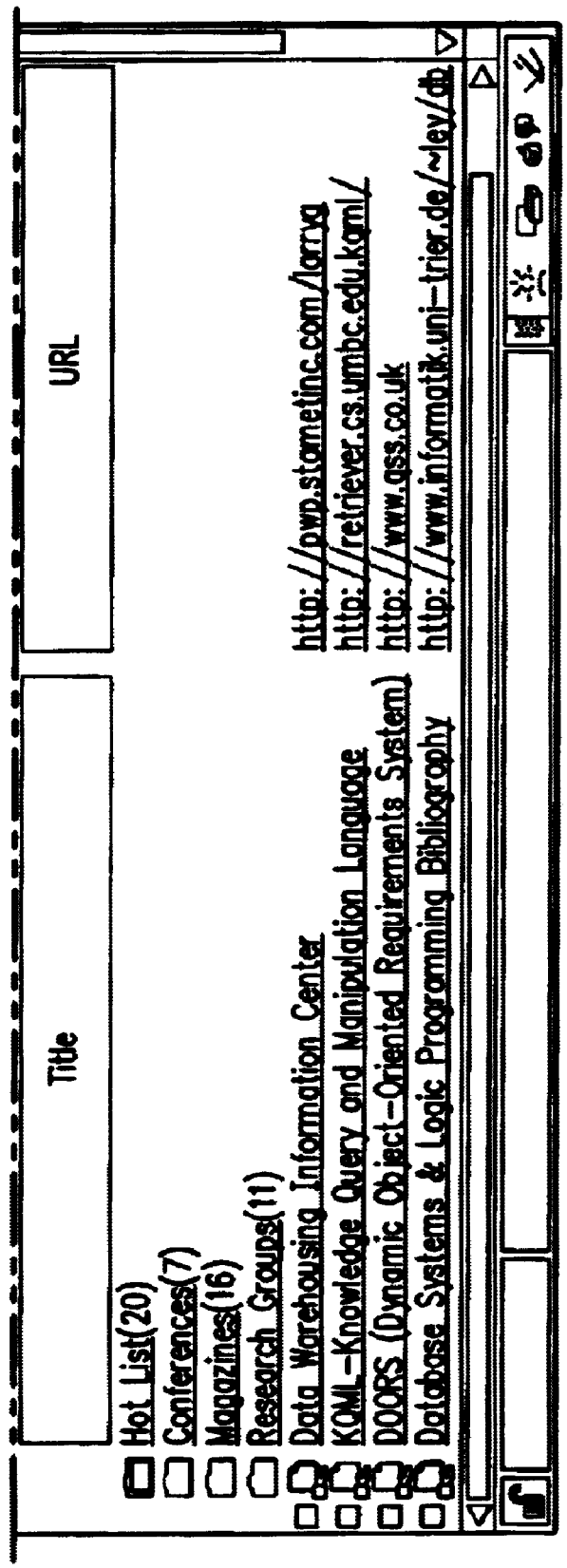

PowerBookmarks provides both efficient navigation and complex query processing. Some of the relations among documents, folders, keywords, users, and owners are illustrated above in FIG. 9. Under such organization, PowerBookmarks provides fast response time for navigation without relatively expensive query processing. As discussed above, FIG. 11 shows navigation trees 1110 and 1120. A user can select a category to access bookmarks in that category (folder). FIG. 14 shows page 1401 listing the documents and folders in the "Computer/Software" category and page 1402 listing the documents and folders in the "Computer/Software/Database". Page 1401 lists not only the user's own bookmarks (shared and private), but also shared bookmarks owned by other users. In addition, dead links detected by the system are also reported using the appropriate icons.

As discussed, when enabled by the user, PowerBookmarks automatically moves dead links and inactive bookmarks to the "Deleted folder" shown at the bottom of the page 1401. Navigation to a sub-node or subcategory is achieved by selecting the corresponding folder for the selected category. For example, when a user selects the "Database" anchor of page 1401, page 1402 is brought up to list the documents and folders of the category "Computer/Software/Database", which is in the next level of navigation tree. Note that pages 1401 and 1402 list different sets of metadata records, according to difference sets of user preferences selected. Also, pages 1401 and 1402 shows that the "Hot List" and the "Deleted Bookmarks" folders are displayed at both pages, since these icons are "shortcuts" to the Hot List and the Deleted Bookmarks.

Figure 15A:
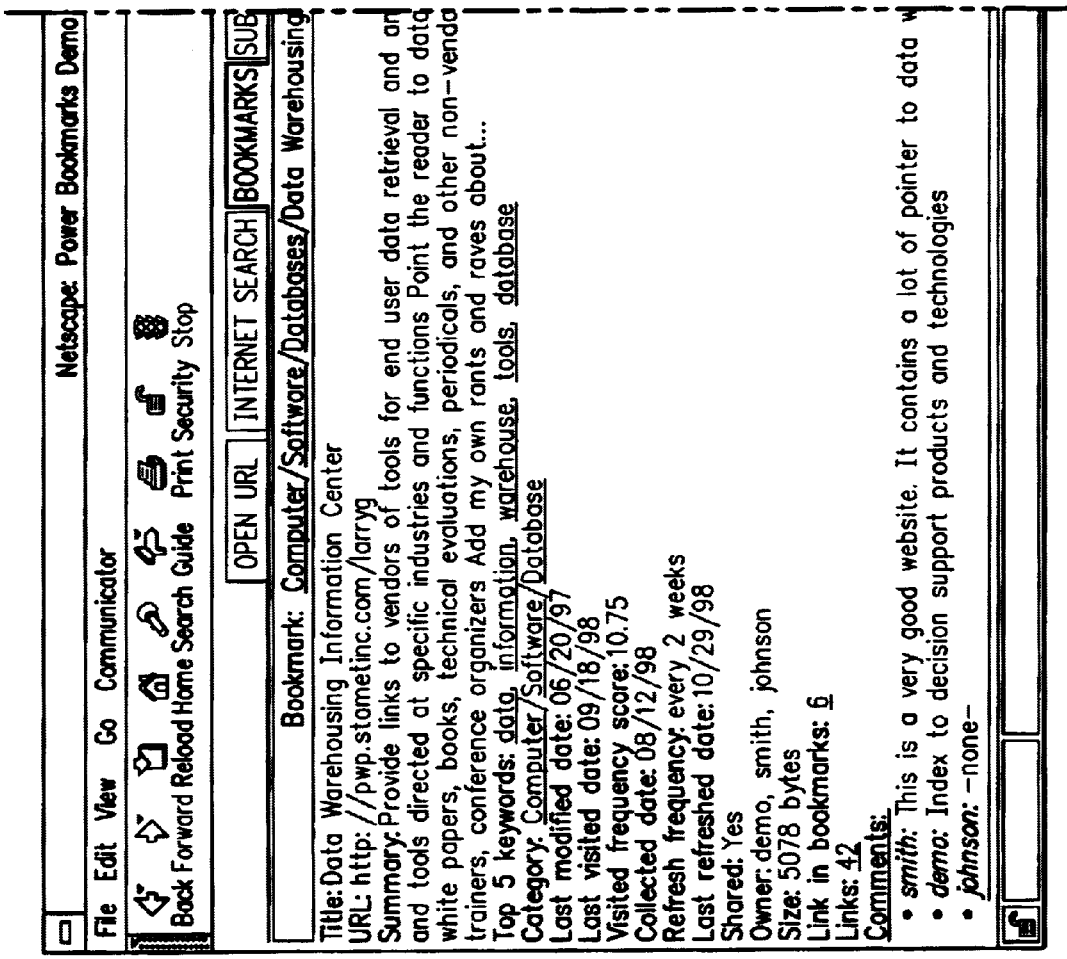
FIG. 15 shows pages 1501 and 1502 that display metadata records of two categories in a navigation tree.
Figure 15:
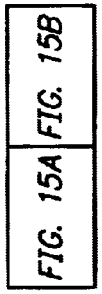
Figure 15B:
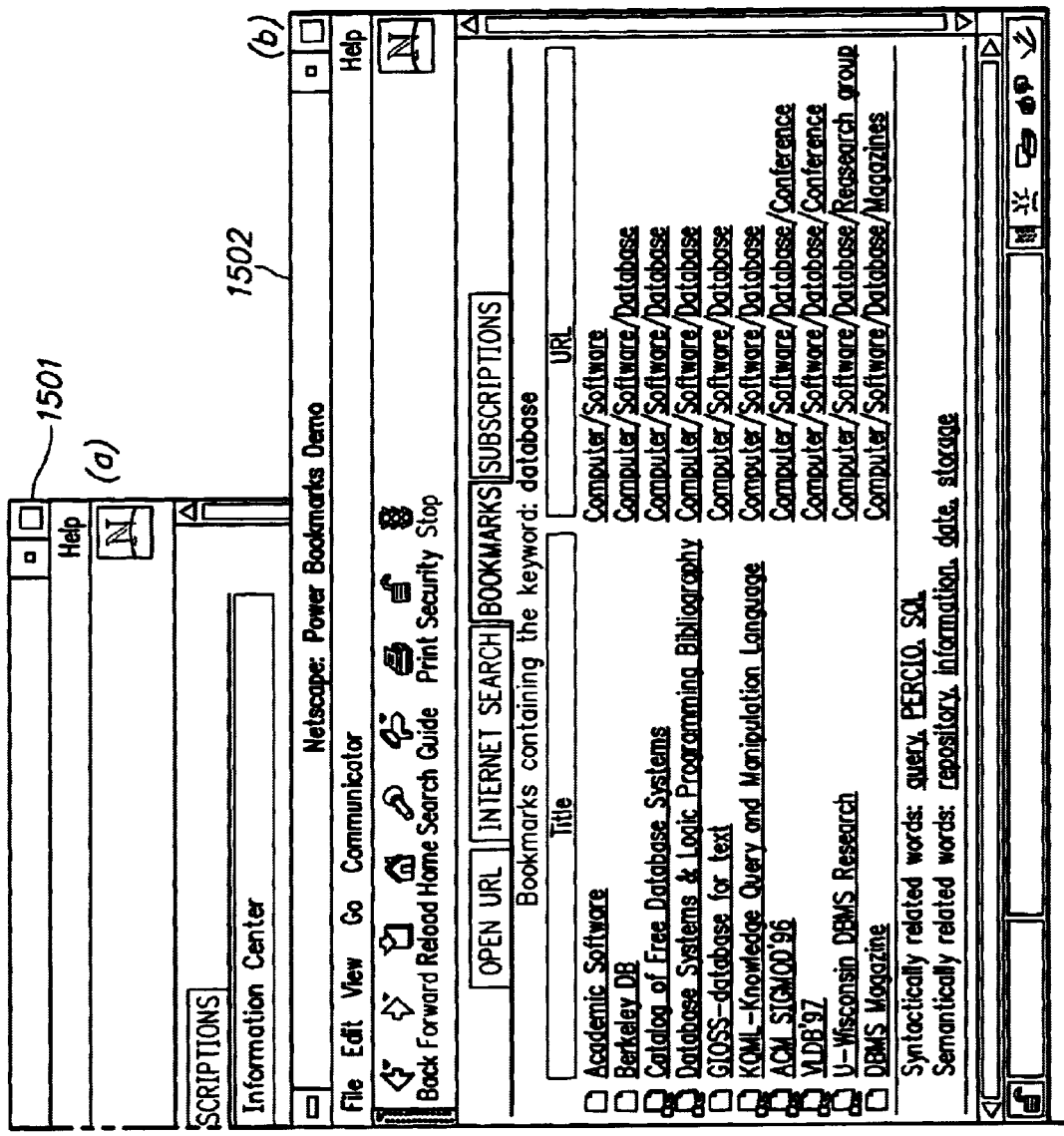

The order in which the documents within a page (e.g., pages 1401 and 1402) are listed is determined by the sorting criteria (e.g., by "last modified date") specified at the top-right of each of pages 1401 and 1402. The user can also select a bookmark from a page to view the actual HTML web document or its metadata records stored on WebDB. FIG. 15 shows pages 1501 and 1502 which display metadata records of two categories in a navigation tree. As shown on page 1501, the detail metadata information for a bookmark includes a summary and its most significant keywords. Further, at the bottom of page 1501, comments are provided by the owners of the bookmark, who specify page 1501 as a shared bookmark. The user can select from the keyword anchor, for example, the "Database" keyword, to navigate to another bookmark pages with such a keyword (e.g., page 1502). Page 1502 includes all documents with the keyword "Database" and their respective classification categories. At the bottom of page 1502, PowerBookmarks provides links to the documents with related keywords. The semantically similar keywords are generated by consulting an on-line lexical dictionary, such as WordNet. The syntactically related keywords are produced based on a word co-occurrence relationship analysis.

Figure 16:
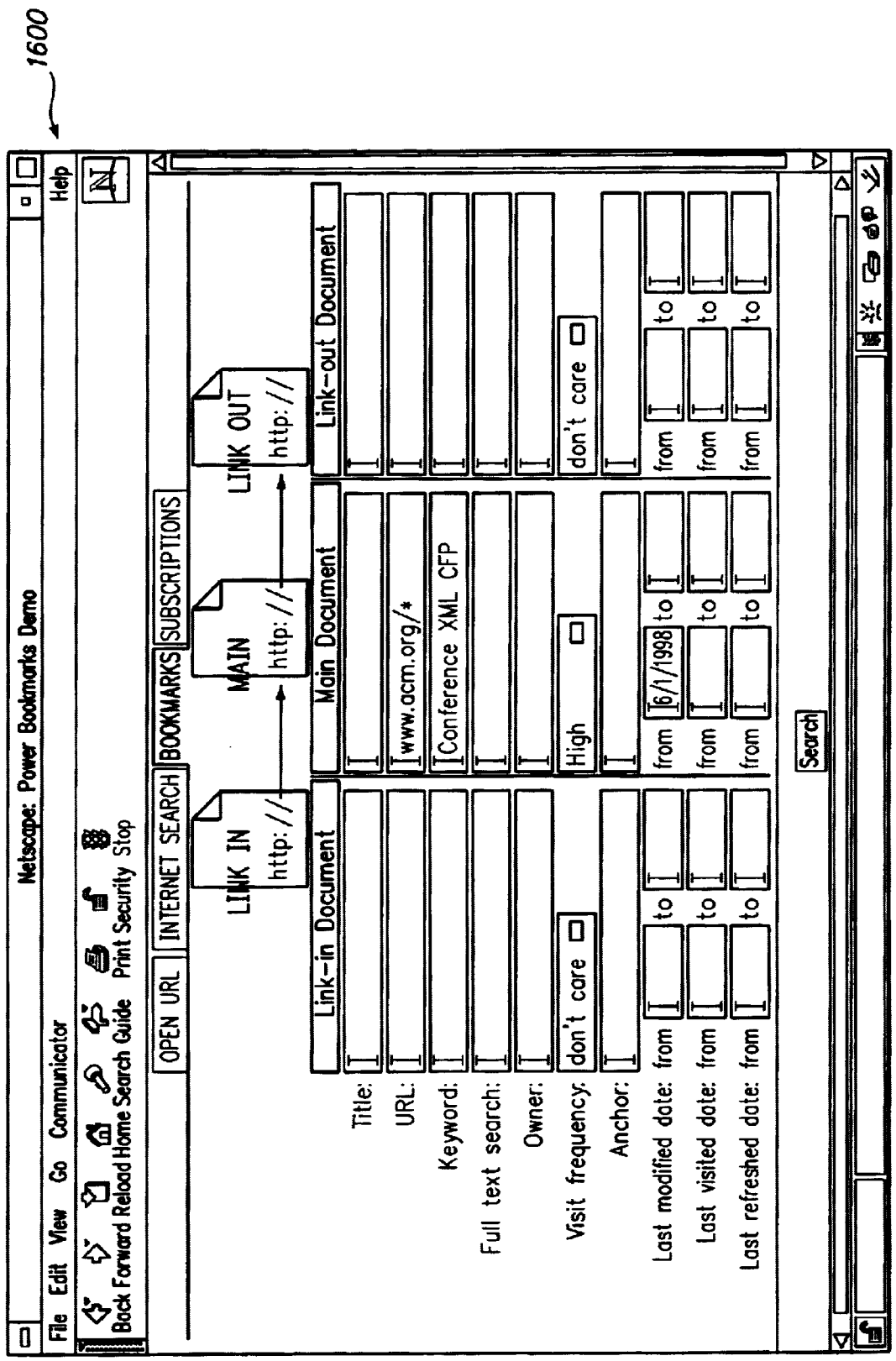
FIG. 16 shows query interface 1600.

In PowerBookmarks another way to search the bookmarks of interests is through query. FIG. 16 shows query interface 1600. For example, as shown in FIG. 16, a user issues a query to retrieve bookmarks related to call for papers for conferences related to "XML". Queries with more complex criteria, such as links, full text search, related keyword search are also supported. Query processing in PowerBookmarks is carried out by the underlying web database WebDB. After the user clicks on the search button, query interface 1600 automatically generates the corresponding WQL query for the underlying query processing engine, WebDB. In this example, the corresponding WQL query generated for the specification of FIG. 16 is:

SELECT Document D1

FROM $User

WHERE}D1.URL LIKE "www.acm.org/*"

AND D1.Keywords mentions "conference", "XML", "CFP"

AND D1.Access_frequency>5.00

AND}D1.Last_modified_date>"Jun. 1, 1998"

($User is a variable identifying the current user)

The default attributes returned by PowerBookmarks include URL, title, and ranking. Other organization services for users to browse through query results are also provided.

Figure 17:
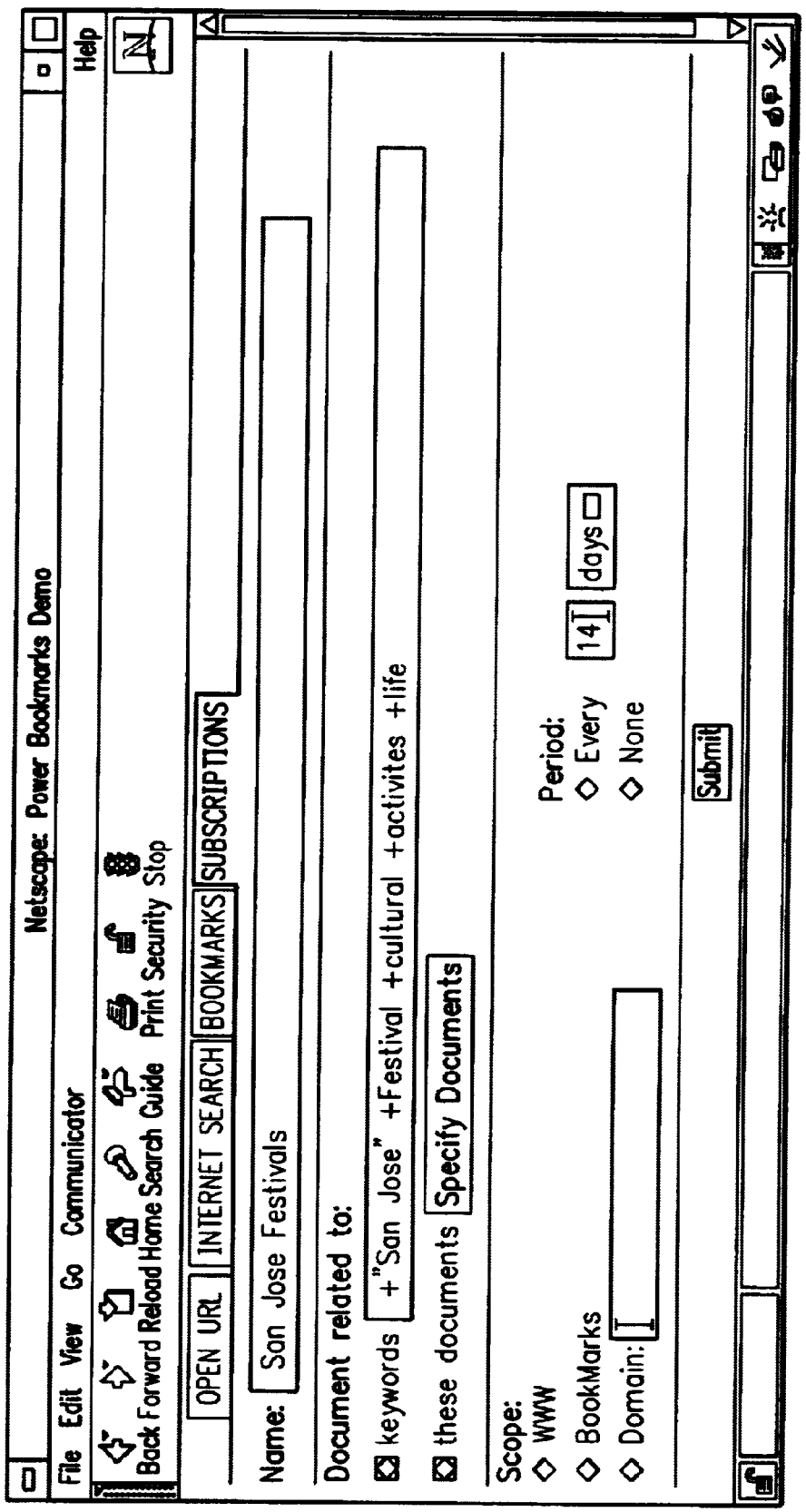
FIG. 17 shows an example of a subscription definition for the folder "San Jose Festivals".

In contrast to the "pull" mode where users actively seek information using queries or navigation, PowerBookmarks' subscription or notification service operates in the "push" mode—a user is notified when a specified document is modified or introduced on the Internet or an intranet. In PowerBookmarks, a user can set the subscription criteria, such as "temporal", "domains", "keyword similarity", or "document similarity". FIG. 17 shows an example of a subscription definition for the folder "San Jose Festivals". As shown in FIG. 17, the user specifies a subscription query on the Internet. In particular, the user is interested in documents related to the specified keywords that were created or modified within the last two weeks. Alternatively, the user can also provide a sample document to subscribe to documents related to the sample document. Upon receiving the sample document, PowerBookmarks extracts significant keywords from the sample document and used the extracted significant keywords to create a subscription definition.

Figure 18:
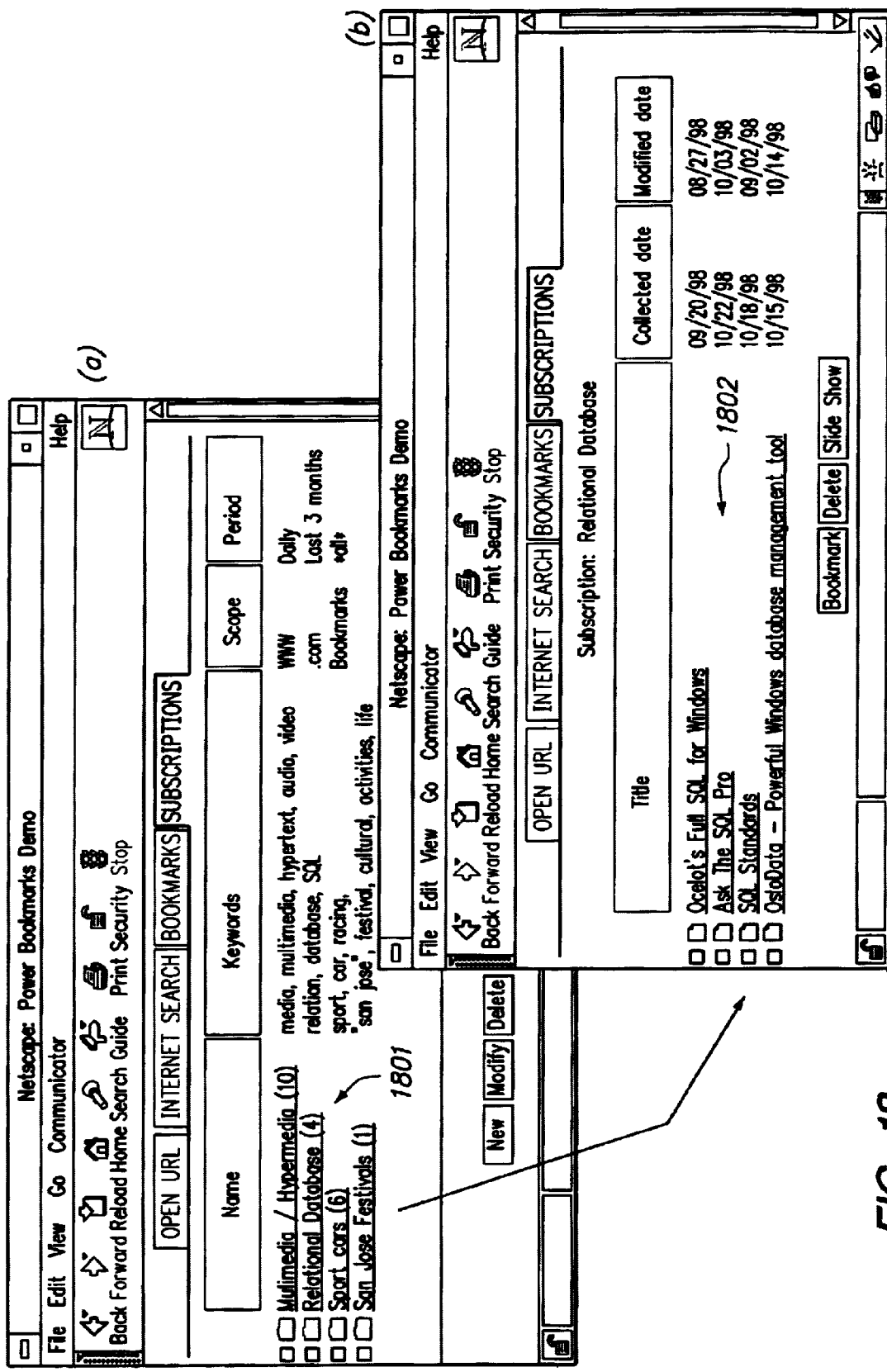
FIG. 18 shows a subscription folder 1801 and its enclosed documents 1802.

To support subscription or notification at the Internet search engine level, PowerBookmarks uses a search engine application program interface (API) that allows incremental searches to be requested. Currently, one example of a search engine that includes such an API is HotBot. In particular, HotBot allows a user to query new documents that are indexed during a two-week window. For a subscription of a new or updated related document on an intranet, PowerBookmarks can notify a subscribing user of the new or updated document immediately upon introduction into the intranet. Thus, for document subscriptions on an intranet, the period of monitoring need not be specified. When a subscribed document corresponding to a bookmark becomes available, the user is notified (e.g. by replacing folder icon 1007 of FIG. 10 by the sparked folder icon 1008). FIG. 18 shows a display window which list a number of subscription folders, including subscription folder 1801, and a second display window showing documents 1802 included in subscription folder 1801.

Figure 19:
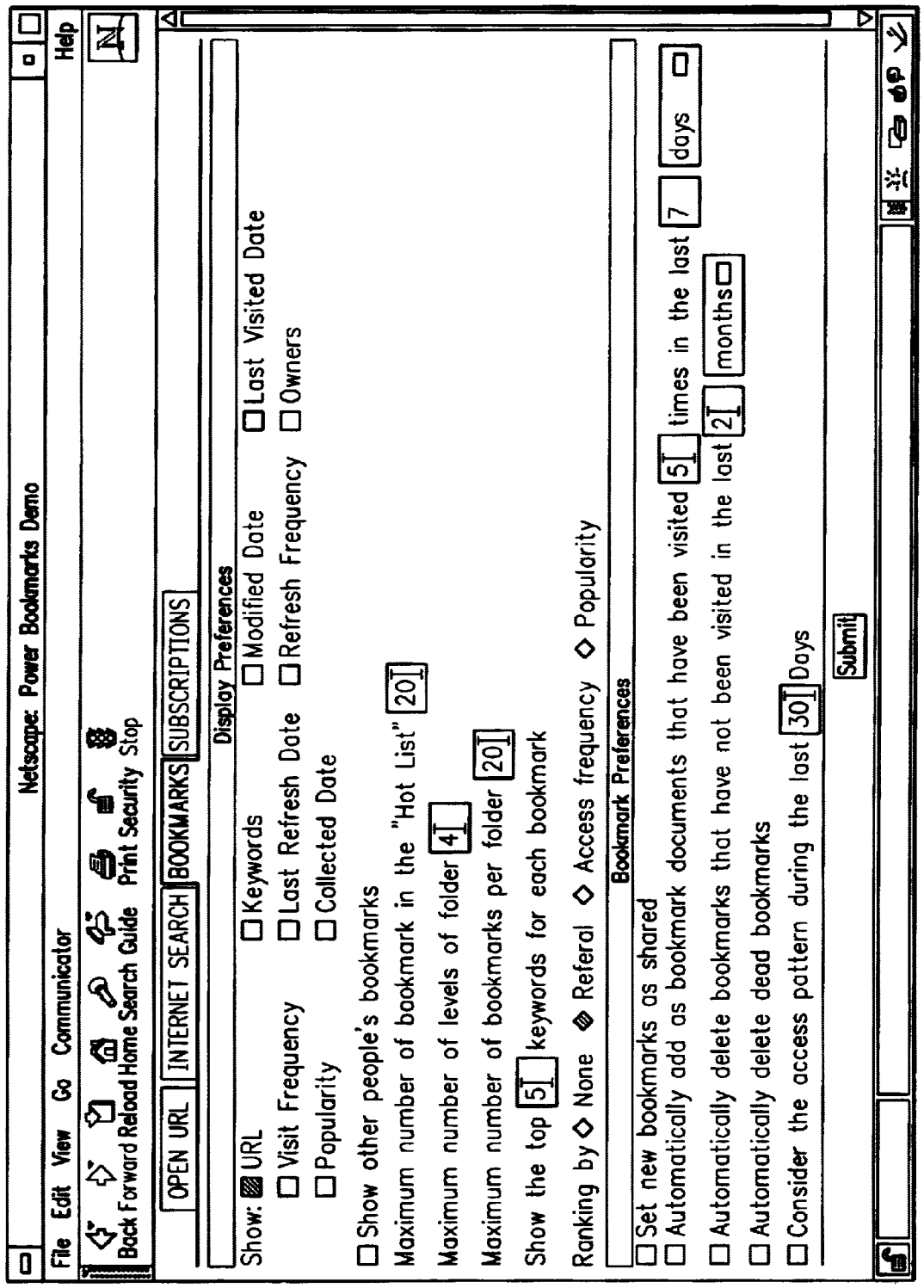
FIG. 19 shows preference setup window 1800 for a user to define personal preferences.

PowerBookmarks allows personalization. FIG. 19 shows preference setup window 1900 for a user to define personal preferences. Preference setup window 1900 allows two types of preferences—display preference and bookmark preference—to be specified.

Display preference parameters allow a user to customize the metadata records shown in the query results or the navigation pages. For example, PowerBookmarks shows different sets of metadata in pages 1401 and 1402 of FIG. 14 described above. When a display preference parameter is specified, the query interface automatically augments the list of fields to project in the SELECT clause to be submitted to WebDB. For example, for displaying page 1401, the SELECT clause is "SELECT Doc.title, Doc.access_frequency, Doc.last_refreshed_date", while for page 1402, the SELECT clause is "SELECT Doc.title, Doc.URL".

The bookmark preferences include (a) the maximum depth and fanout parameters of the navigation trees, (b) ranking preferences and (c) user pattern consideration periods.

With respect to the preferred depth and fanout parameters for the navigation tree, the degree of fanout is set to 20 by default to allow all the folders and documents fit in the screen without scrolling. Note that as discussed above, PowerBookmarks can merge multiple "branches" of a navigation tree (i.e., categories) to reduce the depth of the navigation tree as long as the constraint for maximum degree of fanout is satisfied. By merging categories, the number of navigation steps necessary to a given category is minimized.

With respect to Ranking preferences, PowerBookmarks supports, in addition to the sorting schemes based on document attributes (e.g., titles, URLs), three types of ranking schemes based on metadata. Specifically, the metadata considered includes referral, access frequency, and popularity. The degree of "referral" is defined as the total number of inward links to a document. The values of a "referral" can be viewed as a measure of importance of such pages serving as index pages for navigation (i.e. "landmark nodes"). The number of referral links is derived during the indexing phase.

Access frequency is defined as the number of accesses for a page over a specified period of time. "Popularity" is defined as the percentage of users accessing a page over a specified period of time. Access frequency and popularity provide different indications for the nature of the document. For example, a document with a high "popularity" value but a low access frequency value implies that the document could be a bulletin type of announcement, but cannot be used as an operational reference.

With respect to user pattern considered period, if a user specifies the system to only consider his or her usage pattern in the past "pattern considered period" (say, 14 days), PowerBookmarks ignores the user's access pattern 14 days ago. Based on the value of the "pattern considered period", PowerBookmarks computes temporal decay factor value $\alpha$ which is between 0 and 1.

If the "pattern considered period" is specified, access frequency for day N is calculated as follows:

$$\text{Access\_Frequency\_Score}(N) = \text{Access\_Frequency}(N) + \alpha * \text{Access\_Frequency\_Score}(N-1)$$

where $\alpha = 0.01^{\frac{1}{\text{pattern considered period}}}$

This formula adjusts the weights for the access patterns and the weights for access patterns prior to the pattern considered period are reduced to values less than 0.01. A value of 1 for $\alpha$ makes the system treats all access patterns equally, while a value of 0 makes the system consider only the access patterns of yesterday.

The above detailed description is provided to illustrate the specific embodiments of the present invention and is not intended to be limiting. Numerous variations and modifications within the scope of the present invention are possible. The present invention is set forth in the appended claims.

We claim:

1. A bookmark system having access to a computer network, comprising:
    an interface to said computer network;
    a database management system;
    a bookmark management system coupled to said database and said interface, said bookmark management system creating and maintaining in said database a document record containing information for locating a document in said computer network, and for retrieving said document from said computer network over said interface using said information for locating a document wherein said bookmark management system associates, for each owner, said document record with an owner-specific record and wherein said bookmark management system associates, for each user, said document record with a user-specific record.

2. A bookmark system as in claim 1, further comprising a document classification system for associating said document into one or more categories.

3. A bookmark system as in claim 2, wherein said document classification system accesses an a classifier program on said computer network through said interface.

4. A bookmark system as in claim 2, wherein said categories are leaf nodes of a hierarchical classification trees.

5. A bookmark system as in claim 2, wherein said database system accesses a lexical dictionary for retrieving a list of keywords relating to a document.

6. A bookmark system as in claim 2, wherein each of said categories is a node of a navigation tree.

7. A bookmark system as in claim 6, wherein, in said navigation tree, each category includes less than a predetermined number of documents.

8. A bookmark system as in claim 7, wherein said navigation tree is grown by providing child nodes to an existing node when said predetermined number of documents is exceeded in the category corresponding to said existing node.

9. A bookmark system as in claim 1 wherein said interface couples to a proxy server coupled to said computer network.

10. A bookmark system as in claim 9, wherein said proxy server monitors, for each user, an access frequency for said document.

11. A bookmark system as in claim 10, wherein said bookmark management system automatically associates identification information of a user with a document record when said access frequency of a user exceeds a predetermined number.

12. A bookmark system as in claim 10, wherein said bookmark management system calculates for said document a page rank, said page rank being a function of said access frequency and a quantity related to documents referenced by said document or referencing said document.

13. A bookmark system as in claim 12, wherein said function is a product.

14. A bookmark system as in claim 10, wherein said bookmark management system associates with said document record an access pattern of said document.

15. A bookmark system as in claim 1, wherein said owner-specific record indicates whether information on said owner-specific record is shared.

16. A bookmark system as in claim 15, further comprising a user interface through which a user accesses said bookmark management system, said bookmark management system presents to said user over said user interface a customized view of said document according to information in said owner-specific record and in said document record.

17. A bookmark system as in claim 15, further comprising a graphical user interface, said graphical user interface displaying for each document record shared information of an owner-specific record associated with said document record.

18. A bookmark system as in claim 17, wherein said shared information comprises annotation.

19. A bookmark system as in claim 1, wherein said bookmark management system associates with each document only one document record.

20. A bookmark system as in claim 1, wherein said bookmark management system collects documents by crawling.

21. A bookmark system as in claim 20, wherein said crawling is semnantic-based.

22. A bookmark system as in claim 20, wherein said crawling is domain independent.

23. A bookmark system as in claim 20, said crawling being limited by the number of levels of links followed from said document.

24. A bookmark system as in claim 20, wherein said crawling calculates an estimated time based on said access pattern.

25. A bookmark system as in claim 20, wherein said crawling provides sample documents prior to completion of said crawling.

26. A bookmark system as in claim 20, wherein said crawling is conducted within a specified domain.

27. A bookmark system as in claim 20, said crawling being limited by the number of levels of links pointing to said document.

28. A bookmark system as in claim 20, further comprising a user interface to allow a user to specify parameters of said crawling.

29. A bookmark system as in claim 28, wherein said parameters include number of links to traverse from a seed document.

30. A bookmark system as in claim 28, wherein said parameters include number of levels of links to traverse.

31. A bookmark system as in claim 28, wherein said bookmark management system accessing and displaying a selected number of documents in said crawling prior to completion of said crawling.

32. A bookmark system as in claim 1, wherein said database management system includes a folder that relates said document and other folders by pointers.

33. A bookmark system as in claim 32 wherein said bookmark management system allows traversal of document records and said folders by pointers.

34. A bookmark system as in claim 32 wherein said bookmark management system maintains an access pattern for said document record, said bookmark management system associating said document record with said folder when said access pattern matches predetermined criteria.

35. A bookmark system as in claim 32, wherein a document record associated with said folder is marked for deletion.

36. A bookmark system as in claim 32, wherein said folder references documents records having access frequencies exceeding a predetermined value.

37. A bookmark system as in claim 32, wherein said folder record references documents to be accessed on a regular basis.

38. A bookmark system as in claim 32, wherein said folder record is associated with documents to be accessed when introduced or updated, introducing or updating of said documents being ascertained by performing incremental search.

39. A bookmark system as in claim 38, wherein said bookmark management system informs a user when a document record referenced in said folder is updated.

40. A bookmark system as in claim 1, said bookmark management system provides a page rank based on an evaluation based on one or more of the following quantities: access frequency, popularity and number of referrals.

41. A bookmark system as in claim 1 further including a user configurable graphical user interface.

42. A bookmark system as in claim 41, wherein said user configurable graphical user interface customizing query to said database management system according to a configuration of said configurable graphical user interface.

43. A bookmark system as in claim 1, further comprising a graphical user interface, said graphical user interface displaying for each document record information of an owner-specific record associated with said document record.

44. A bookmark system as in claim 43, wherein said owner-specific record comprises a local title for said document record.

* * * * *

UNITED STATES PATENT AND TRADEMARK OFFICE
CERTIFICATE OF CORRECTION

PATENT NO. : 6,631,496 B1
DATED : October 9, 2003
INVENTOR(S) : Wen-Syan Li and Quoc Vu It is certified that error appears in the above-identified patent and that said Letters Patent is hereby corrected as shown below:

Column 1,
Line 6, after "related", insert -- to --.
Line 10, delete "NEC USA, Inc." and insert -- NEC CORPORATION --

Column 6,
Line 53, delete "owner's Peter" and insert -- owner Peter's --.

Column 7,
Line 67, delete "only" (first occurrence).

Column 8,
Line 7, delete "show" and insert -- shows --.
Line 23, after "users", insert -- to --.
Line 64, after "user", insert -- to --.

Column 9,
Line 61, after "then", insert -- be --.

Column 12,
Line 43, delete "consider" and insert -- consideration --.
Line 66, after "bottom of", delete "the".

Column 13,
Line 55, delete ""Jun. 1, 1998"" and insert -- "6/1/98" --.

Column 14,
Line 52, after "documents", insert -- to --.

Column 15,
Line 61, delete "an".

UNITED STATES PATENT AND TRADEMARK OFFICE
CERTIFICATE OF CORRECTION

PATENT NO. : 6,631,496 B1
DATED : October 9, 2003
INVENTOR(S) : Wen-Syan Li and Quoc Vu It is certified that error appears in the above-identified patent and that said Letters Patent is hereby corrected as shown below:

Column 16,
Line 54, delete "semnantic-based" and insert -- semantic-based --.

Signed and Sealed this

Seventh Day of June, 2005

JON W. DUDAS
*Director of the United States Patent and Trademark Office*